United States Patent
Bata et al.

(10) Patent No.: US 8,149,748 B2
(45) Date of Patent: Apr. 3, 2012

(54) WIRELESS DATA NETWORKING

(75) Inventors: Anthony Paul Bata, Denver, CO (US);
Kenneth Ray Crismon, Bennett, CO (US); David Kramer, Westminster, CO (US); Randy Lyle Engle, Colorado Springs, CO (US)

(73) Assignee: Raytheon Company, Waltham, MA (US)

( * ) Notice: Subject to any disclaimer, the term of this patent is extended or adjusted under 35 U.S.C. 154(b) by 1119 days.

(21) Appl. No.: 11/939,562

(22) Filed: Nov. 14, 2007

(65) Prior Publication Data
US 2008/0291855 A1 Nov. 27, 2008

Related U.S. Application Data

(60) Provisional application No. 60/865,843, filed on Nov. 14, 2006.

(51) Int. Cl.
G08C 17/00 (2006.01)
(52) U.S. Cl. ......... 370/311; 370/340; 370/310; 370/338
(58) Field of Classification Search .................. 370/455, 370/463, 465, 509, 443, 522, 311, 338; 455/56.3, 455/404.1, 414.1, 556, 428
See application file for complete search history.

(56) References Cited

U.S. PATENT DOCUMENTS

| | | | |
|---|---|---|---|
| 6,690,655 B1 * | 2/2004 | Miner et al. | 370/278 |
| 6,972,682 B2 | 12/2005 | Lareau et al. | |
| 2002/0119780 A1 * | 8/2002 | Roux et al. | 455/442 |
| 2004/0010510 A1 * | 1/2004 | Hotti | 707/103 R |
| 2004/0146019 A1 * | 7/2004 | Kim et al. | 370/329 |
| 2004/0192377 A1 * | 9/2004 | Park et al. | 455/552.1 |
| 2004/0212678 A1 * | 10/2004 | Cooper et al. | 348/155 |
| 2004/0233041 A1 | 11/2004 | Bohman et al. | |
| 2005/0169270 A1 * | 8/2005 | Mutou et al. | 370/390 |
| 2006/0039250 A1 * | 2/2006 | Cherubini et al. | 369/44.27 |
| 2006/0088018 A1 | 4/2006 | Black et al. | |
| 2006/0092896 A1 | 5/2006 | Mulligan et al. | |
| 2006/0140135 A1 * | 6/2006 | Bonta et al. | 370/254 |
| 2007/0064887 A1 * | 3/2007 | Bjorklund et al. | 379/88.17 |
| 2007/0265533 A1 * | 11/2007 | Tran | 600/481 |

OTHER PUBLICATIONS

Microchip, AN734, Using the PICmicro SSP for Slave I2C Communication, Bowling, DS00734A, © 2002, 15pages.
Amtel, AVR315, Using the TWI module as I2C master, 8-bit AVR Microcontrollers, Application Note, Rev: 2564B-AVR-09/04, 11 pages.

* cited by examiner

*Primary Examiner* — Hassan Phillips
*Assistant Examiner* — Anez Ebrahim
(74) *Attorney, Agent, or Firm* — Schwegman, Lundberg & Woessner, P.A.

(57) ABSTRACT

A meshing network comprising one full function controller (WDC) and a plurality of nodes (WDN, WSN), that is RF quiet capable with very low power consumption and the ability to quickly heal itself and create new network paths. The network uses an addressing scheme that allows for each node to not have a network map but still be able to route messages. A piping scheme allows a mesh to become a high throughput network. A sensor rail protocol definition allows sensor devices to connect to nodes and route messages through the network.

20 Claims, 13 Drawing Sheets

WSNs, arranged in Groups (1-30)

Wireless Data Controller (WDC)

Wireless Node (WSN, WDN)

Remote Data Controller (RDC)

Always Available Wireless Node (AAWN)

Sample Deployment

AWAVE Mesh Network
and Sensors

•Contains
sensors per
customer reqs
•Contains radio
and antenna

•Communicates
with the WSNs
and xTango
server over the
xTango mesh
network

• Controls the xTango
network and manages the
data to/ from the WDC
• DB interface
• Communication Sleep/RF Quiet Fast Sync Slow Sync Fast Sync and Slow Sync Synchronization Period Data Period - Upstream Data Normal Data Mode Period
Upstream Data Normal Data Mode Period
Downstream Data Network Running - Pipeline

SAIL Configuration

This diagram shows the messages and message flow for the SAIL device network configuration. The WDN network will bring up SAIL power and wait 1mS before attempting to configure SAIL. The WDN will periodically flush the network configuration and restart the network to picke up any new devices.

FIG. 18A
OUTBOUND MESSAGES

This is a diagram of the message flow for a message originating at the Sensor Device. The message will be sent to the known WDN address on the SAIL and will be routed into the 802.15.4. network.

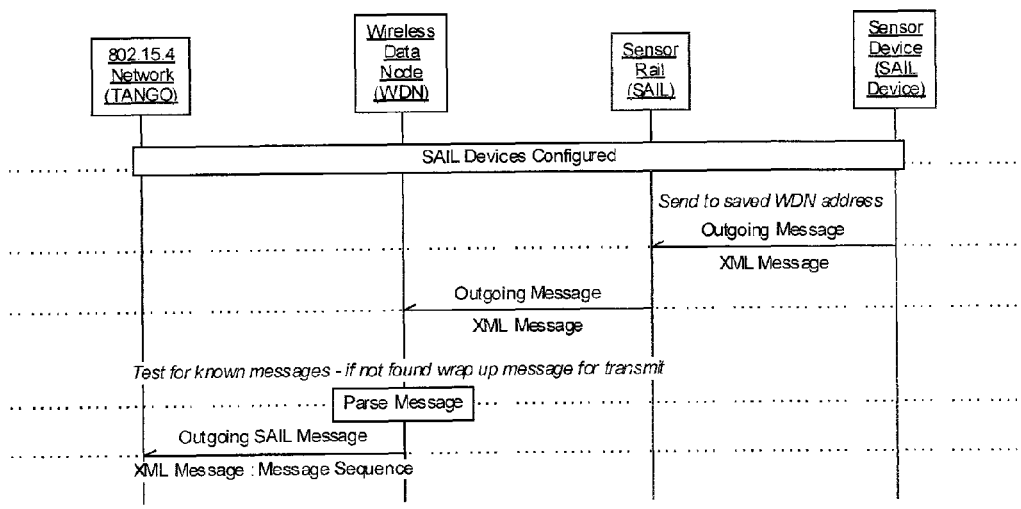

FIG. 18B
INBOUND MESSAGE

This is the sequence diagram for an inbound message from the 802.15.4. network. The message will be routed to a specific WDN address and will be parsed and sent to the correct device. For the moment, broadcast addresses are not allowed for inbound messages.

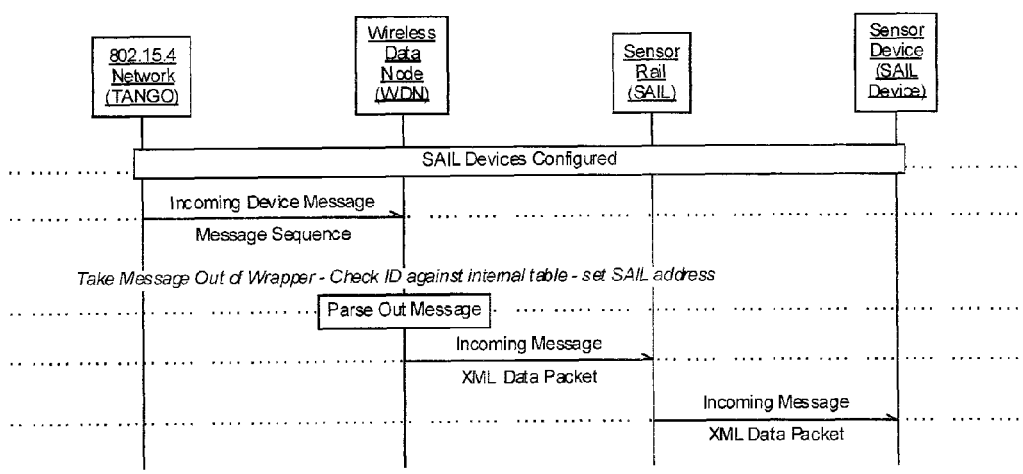

WIRELESS DATA NETWORKING

CROSS-REFERENCE TO RELATED APPLICATIONS

This is a non-provisional filing of 60/865,843 filed 14 Nov. 2006 by Anthony (Tony) Bata, Ken Crismon, David Kramer.

FIELD OF THE INVENTION

The invention relates to data networks and, more particularly to wireless data networks and, more particularly, to mesh networks.

BACKGROUND OF THE INVENTION

A wide variety of different wireless data technologies now exist, some in direct competition with one another, others designed to be optimal for specific applications. Wireless technologies can be evaluated by a variety of different metrics. Generally, these can be grouped as follows:

UWB, Bluetooth, ZigBee, and Wireless USB are intended for use as so called Wireless PAN systems. They are intended for short range communication between devices typically controlled by a single person. A keyboard might communicate with a computer, or a mobile phone with a handsfree kit, using any of these technologies.

The ZigBee set of high level communication protocols is based upon the specification produced by the IEEE 802.15.4 taskgroup.

IEEE 802.15 IEEE 802.15 is the 15th working group of the IEEE 802 which specializes in Wireless PAN (Personal Area Network) standards. It includes five task groups (numbered from 1 to 5). IEEE 802.15.4-2003 (Low Rate WPAN) deals with low data rate but very long battery life (months or even years) and very low complexity. The first edition of the 802.15.4 standard was released in May 2003. In March 2004, after forming Task Group 4b, task group 4 put itself in hibernation.

Mesh Networking

Mesh networking is a way to route data, voice and instructions between nodes. It allows for continuous connections and reconfiguration around broken or blocked paths by "hopping" from node to node until the destination is reached. A mesh network whose nodes are all connected to each other is a fully connected network. Mesh networks differ from other networks in that the component parts can all connect to each other via multiple hops, and they generally are not mobile. Mesh networks can be seen as one type of ad hoc network. Mobile ad-hoc networking (MANet), and mesh networking are therefore closely related, but mobile ad hoc networks also have to deal with the problems introduced by the mobility of the nodes.

Mesh networks are self-healing: the network can still operate even when a node breaks down or a connection goes bad. As a result, a very reliable network is formed. This concept is applicable to wireless networks, wired networks, and software interaction.

A wireless mesh network is a mesh network implemented over a wireless network system such as wireless LAN.

Mesh networks may involve either fixed or mobile devices. The solutions are as diverse as communications in difficult environments such as emergency situations, tunnels and oil rigs to battlefield surveillance and high speed mobile video applications on board public transport or real time racing car telemetry.

The principle is similar to the way packets travel around the wired Internet—data will hop from one device to another until it reaches a given destination. Dynamic routing capabilities included in each device allow this to happen. To implement such dynamic routing capabilities, each device needs to communicate its routing information to every device it connects with, "almost in real time". Each device then determines what to do with the data it receives—either pass it on to the next device or keep it. The routing algorithm used should attempt to always ensure that the data takes the most appropriate (fastest) route to its destination with the fewest number of transmissions down incorrect network routes/paths.

Routing Tables

In computer networking a routing table, or Routing Information Base (RIB), is an electronic table (file) or database type object that is stored in a router or a networked computer. The routing table stores the routes (and in some cases, metrics associated with those routes) to particular network destinations. This information contains the topology of the network immediately around it. The construction of routing table is the primary goal of routing protocols and static routes.

Routing tables are generally not used directly for packet forwarding in modem router architectures; instead, they are used to generate the information for a smaller forwarding table which contains only the routes which are chosen by the routing algorithm as preferred routes for packet forwarding, often in a compressed or pre-compiled format that is optimized for hardware storage and lookup.

Related Patents and Publications

U.S. Pat. No. 6,972,682 (Lareau et al., 2005), incorporated by reference herein, discloses monitoring and tracking of assets by utilizing wireless communications. Systems, devices, methods, and programs disclosed herein provide a solution for monitoring and tracking assets by utilizing wireless communications. A representative system for monitoring assets includes a remote monitoring station (RMS) and a network of identification (ID) tags. Each ID tag is coupled to an asset and is configured to wirelessly communicate with other ID tags in the network within a predetermined proximity. Each tag is also configured to relay communications from other ID tags so that a communication path is established between the RMS and any ID tag in the network, either directly or via other ID tags.

US Patent Publication 20060088018, incorporated by reference herein, discloses system and method for communicating over an 802.15.4 network. A method of reducing data transfer while increasing image information over an 802.15.4 network includes obtaining an image with a sensor, modulating a representation of the image using a first 802.15.4 modem, sending the representation of the image to a coordinator, demodulating the representation of the image using a second 802.15.4 modem, and digitally enhancing at least one of the representation of the image and the image. A system for communication over an 802.15.4 network includes a sensor for obtaining data, the size of the data being at least an order of magnitude greater than the size of an 802.15.4 packet, a first 802.15.4 modem coupled to the sensor, a buffer for temporarily storing the data to allow transmission of portions of the data; the buffer being coupled to the sensor, a coordinator coupled to the sensor, the coordinator being capable of communicating with a computer, and a second 802.15.4 modem coupled to the coordinator. As further disclosed therein:

This application relates generally to data communication and particularly to data communication using the wireless IEEE 802.15.4 protocol over a WPAN (wireless personal area network) optimized for low power, low data rate networks.

A brief history of the IEEE 802.15.4 protocol development begins as follows: whereas IEEE 802.11 (WiFi) was concerned with features such as ethernet matching speed, long range (100 m), complexity to handle seamless roaming, message forwarding, and data throughput of 2-11 Mbps; WPANs (Wireless Personal Area Networks) are focused on a space around a person or object that typically extends up to 10 m in all directions. The focus of WPANs is low-cost, low power, short range, and very small size. The IEEE 802.15 working group currently defined three classes of WPANs that are differentiated by data rate, battery drain, and quality of service (QoS). The present invention concerns the last class. The first class, a high data rate WPAN (IEEE 802.15.3) is suitable for multi-media applications that require very high QoS. Medium rate WPANs (IEEE 802.15.1/Bluetooth) will handle a variety of tasks ranging from cell phones to PDA communications and have QoS suitable for voice communications. The last class, a low rate WPANs (IEEE 802.15.4/LR-WPAN) is intended to serve a set of industrial, residential, and medical applications. These applications have very low power consumption, a cost requirement not considered by the above WPANs, and relaxed needs for data rate and QoS. The low data rate enables the LR-WPAN to consume very little power.

The IEEE 802.15.4 wireless protocol is still in its infancy and is being rolled out primarily in applications such as sensors, interactive toys, smart badges, remote controls, remote metering, and home and industrial automation. The 802.15.4 protocol supports data rates of 250 kbps at 2.405-2.480 Ghz with 16 channels (world-wide), 40 kbps at 902-928 Mhz with 10 channels (Americas), and 20 kbps at 868.3 Mhz with 1 channel (Europe). The protocol supports automatic network establishment by the coordinator; a fully hand-shaked protocol for transfer reliability; and power management to ensure low power consumption. The wireless IEEE 802.15.4-2003 standard was approved in May of 2003 and was published in October of the same year. The standard is still under further development with 2 additional task groups, 802.15.4a and 802.15.4b continuing the development. Current areas of development (as of September 2005) include resolving ambiguities, reducing unnecessary complexity, increasing flexibility in security key usage, and considerations for newly available frequency allocations among others.

General requirements of sensor/control networks include that they can be quite large, employing 255 clusters of 254 nodes each (64,770 nodes); are suitable for latency-tolerant applications; can operate very reliably for years without any operator intervention; have very long battery life (up to several years from an AA cell); very low infrastructure cost (low device and setup costs); very low complexity and small size; and device data rates and QoS (Quality of Service, i.e., delay, jitter, throughput, and reliability) needs are low.

The IEEE 802.15.4 standard was developed to address the low power, low-bandwidth market; primarily focused on controls signals. In general terms, 802.15.4 is seen as one of the lowest-bandwidth wireless technologies available on the market today, and provides the corresponding benefit of long battery life. Presentations typically show the following: TABLE-US-00001 TABLE 1 Technology Range Data Rate 802.15.4 WPAN to WLAN <0.25 Mbps 802.15.1 (Bluetooth) WPAN>0.1 Mbps; <1 Mbps 802.11 (WiFi) WLAN>1 Mbps; <100 Mbps Zigbee is a protocol layer that sits "on top" of 802.15.4, and seeks to establish an interoperability standard for many companies to adopt, and to enable a smarter network with intelligence. ZigBee, or 802.15.4, sits below Bluetooth in terms of data rate. The operational range of ZigBee is typically stated as 10-75 m compared to 10 m for Bluetooth. ZigBee uses a basic master-slave configuration suited to static star networks of many infrequently use devices that talk via small data packets. Bluetooth's protocol is more complex since it is geared towards handling voice, images, and file transfers in ad-hoc networks. Bluetooth devices can support scatternets of multiple smaller non-synchronized networks (piconets). It only allows up to 8 slave nodes in a basic master-slave piconet set-up. ZigBee nodes spend much of their time sleeping, but the protocol is optimized for quick wake up and response. When a ZigBee node is powered down, it can wake up and get a packet in around 15 msec whereas a Bluetooth device would take around 3 sec to wake up and respond.

US Patent Publication No. 20060092896, incorporated by reference herein, discloses method of communication between reduced functionality devices in an IEEE 802.15.4 network. In a 802.15.4 network, each reduced functionality device (RFD) is permitted to communicate with only an assigned full function device (FFD). The present invention allows each of the RFDs to communicate with another RFD upon the RFD determining that the local FFD assigned to the RFD is inoperable or unable to communicate. Under emergency conditions, the RFD is able to communicate with a closely located RFDs such that the closely located RFDs can receive and respond to an emergency situation and/or repeat the message. To satisfy the 802.15.4 standards, communication between the RFDs is allowed only during emergency conditions and when the FFD is inoperative. A comprehensive test procedure is included to insure the integrity of the system is preserved at all times. As further disclosed therein:

IEEE standard 802.15.4 was developed to standardize communication between devices operating within a local area network (LAN). The IEEE standard was targeted at home, building and industrial automation and controls, consumer electronics, PC profiles and medical monitoring. The standards define the interoperability, certification testing and branding of devices that operate within the IEEE standard.

In a standard 802.15.4 network, the network includes three different device types. The first device type is classified as a network coordinator and maintains overall network knowledge.

The second type of device type in a 802.15.4 network is referred as a full function device (FFD). Each of the FFDs has full communication functionality with all the features required by the 802.15.4 standard. Further, the FFD includes additional memory and computing power that makes it ideal for acting as a network router. Each of the FFDs is able to communicate with both the network coordinator and lower level devices referred to as reduced function devices (RFDs).

The third type of device included in the 802.15.4 network is a reduced function device (RFD) that is designed to communicate with a single FFD. Each RFD includes limited functionality as specified by the 802.15.4 standard to limit the cost and complexity of the RFD. As required by the literal interpretation 802.15.4 standard, each RFD communicates solely with an FFD and cannot communicate with other RFDs.

The 802.15.4 network is contemplated as being particularly desirable in transmitting information within a building automation system. For example, each of the RFDs could be an environmental sensor, smoke detector, motion detector or any other kind of monitoring equipment that is required for monitoring and controlling the operation of a building.

Although the 802.15.4 networking configuration has worked well, a problem can occur if and when a FFD is rendered inoperative or is out of communications, such as during a power interruption. FFDs are generally designed to be online at all times and therefore are normally line powered. RFDs, by design, are not always online and typically are battery powered. When one of the FFDs is removed from the network, such as during the power loss to the FFD, the RFDs associated with the disabled FFD are unable to communicate information across the network unless they are within communication range of another FFD. If most or all of the FFDs are removed from the network (as might be the case during a power outage), then all of the RFDs will be unable to communicate a detected alarm condition. This drawback can become important when the RFDs are safety devices, such as smoke detectors.

Therefore, a need exists for an improved communication method operating within the 802.15.4 standard or any extension thereof, that allows for communication during emergency situations or when one or more of the FFDs has been rendered inoperative.

Prior wireless networks and current ZigBee implementation devices need a way to periodically check in and link up with the network to send information (events, network maps, etc). Anytime a device is listening on the network it is at it's highest power drain—conversely anytime a device is asleep it is unable to route other messages. Therein lies the problem ZigBee operates by having one to many FFD (Full Function Devices) that are powered from unlimited sources (AC power usually, or really big batteries) because they are up all the time. These FFDs are placed in fixed places as usually they are plugged in. Battery device RFDs usually need to be within one hop of the FFD to communicate, and need to be up listening to catch incoming setting messages. Hence the "static or limited movement" type of network.

Each of the RFD devices needs to beacon to find FFDs to communicate and get associated with. That is the way the remote devices let the FFDs know to add them to the routing tables.

GLOSSARY

Unless otherwise noted, or as may be evident from the context of their usage, any terms, abbreviations, acronyms or scientific symbols and notations used herein are to be given their ordinary meaning in the technical discipline to which the invention most nearly pertains. The following terms, abbreviations and acronyms may be used throughout the descriptions presented herein and should generally be given the following meaning unless contradicted or elaborated upon by other descriptions set forth herein. Some of the terms set forth below may be registered trademarks (®) and/or internal nomenclature (if internal nomenclature, listed here without imlying or inferring that it is prior art.)

802.15.4 an IEEE standard, sometimes erroneously referred to as "ZigBee". The IEEE 802.15 Task Group (TG4) was chartered to investigate a low data rate solution with multi-month to multi-year battery life and very low complexity. It is operating in an unlicensed, international frequency band. Potential applications are sensors, interactive toys, smart badges, remote controls, and home automation.

bitmask In computer science, a mask is some data that, along with an operation, is used in order to extract information stored elsewhere. The most common mask used, also known as a bitmask, extracts the status of certain bits in a binary string or number (a bit field or bit array). For example, if we have the binary string 10011101 (eight bits) and we want to extract the status of the fifth bit (counting from the left), we would use a bitmask such as 00001000 (which has a "1" in its fifth bit) and use the bitwise AND operator. A common type of mask of this type is a subnetwork mask, which is associated with a device's IP address and used to instruct a router which bits of the address indicate the subdivision of the network the computer is on and which identify the specific computer within the subnetwork.

Byte A binary digital signal is essentially a string of ones and zeros—in other words, one voltage level or another, typically with no values in-between. Since having only two fingers (or one, depending on how you count) is not a very useful means of representing a wide number of variables, such as letters of the alphabet, it soon became apparent to bundle bits into bytes, such as eight bits to a byte. An 8-bit byte can represent 256 different values, generally plenty for representing letters of an alphabet, numerals and special characters. When more different values are needed, the bytes can be made longer (more bits per byte), or bytes can be strung together into words. MB is short for megabyte, one million bytes.

Computer A programmable machine. The two principal characteristics of a computer are:
 It responds to a specific set of instructions in a well-defined manner.
 It can execute a pre-recorded list of instructions (a program).
 Modern computers are electronic and digital. The actual machinery—wires, transistors, and circuits—is called hardware; the instructions and data are called software.

CSMA/CA In computer networking, CSMA/CA belongs to a class of protocols called multiple access methods. CSMA/CA stands for: Carrier Sense Multiple Access With Collision Avoidance. In CSMA, a station wishing to transmit has to first listen to the channel for a predetermined amount of time so as to check for any activity on the channel. If the channel is sensed "idle" then the station is permitted to transmit. If the channel is sensed as "busy" the station has to defer its transmission. This is the essence of both CSMA/CA and CSMA/CD. In CSMA/CA (LocalTalk), once the channel is clear, a station sends a signal telling all other stations not to transmit, and then sends its packet. In Ethernet 802.11, the station continues to wait for a time, and checks to see if the channel is still free. If it is free, the station transmits, and waits for an acknowledgment signal that the packet was received.

Database A computer database is a structured collection of records or data that is stored in a computer system so that a computer program or person using a query language can consult it to answer queries. The records retrieved in answer to queries are information that can be used to make decisions. The computer program used to manage and query a database is known as a database management system (DBMS). The properties and design of database systems are included in the study of information science.

Flat model—A flat (or table) model consists of a single, two-dimensional array of data elements, where all members of a given column are assumed to be similar values, and all members of a row are assumed to be related to one another.

Hierarchical model—In a hierarchical model, data is organized into a tree-like structure, implying a single upward link in each record to describe the nesting, and a sort field to keep the records in a particular order in each same-level list.

Network model—The network model tends to store records with links to other records. Associations are tracked via "pointers". These pointers can be node numbers or disk addresses. Most network databases tend to also include some form of hierarchical model.

Relational model—A relational database contains multiple tables, each similar to the one in the "flat" database model. One of the strengths of the relational model is that, in principle, any value occurring in two different records (belonging to the same table or to different tables), implies a relationship among those two records.

ECC internal nomenclature. short for Expeditionary Communication Control. Device with a computer and a modem, control the Tango network.

EEPROM short for electrically-erasable read only memory. With EEPROMs, a program tells the chip's controller to give it electronic amnesia and then downloads the new code (data) into it.

Email short for electronic mail.

Embedded System An embedded system is a special-purpose computer system designed to perform one or a few dedicated functions, sometimes with real-time computing constraints. It is usually embedded as part of a complete device including hardware and mechanical parts. In contrast, a general-purpose computer, such as a personal computer, can do many different tasks depending on programming. Since the embedded system is dedicated to specific tasks, design engineers can optimize it, reducing the size and cost of the product, or increasing the reliability and performance. Some embedded systems are mass-produced, benefiting from economies of scale. Physically, embedded systems range from portable devices such as digital watches and MP3 players, to large stationary installations like traffic lights, factory controllers, or the systems controlling nuclear power plants. Complexity varies from low, with a single microcontroller chip, to very high with multiple units, peripherals and networks mounted inside a large chassis or enclosure.

Ethernet A local-area network (LAN) architecture developed by Xerox Corporation in cooperation with DEC and Intel in 1976. Ethernet uses a bus or star topology and supports data transfer rates of 10 Mbps. The Ethernet specification served as the basis for the IEEE 802.3 standard, which specifies the physical and lower software layers. Ethernet uses the CSMA/CD access method to handle simultaneous demands. It is one of the most widely implemented LAN standards. A newer version of Ethernet, called 100 Base-T (or Fast Ethernet), supports data transfer rates of 100 Mbps. And the newest version, Gigabit Ethernet supports data rates of 1 gigabit (1,000 megabits) per second.

Firmware In computing, firmware is a computer program that is embedded in a hardware device, for example a microcontroller. It can also be provided on flash ROMs or as a binary image file that can be uploaded onto existing hardware by a user. As its name suggests, firmware is somewhere between hardware and software. Like software, it is a computer program which is executed by a computer. But it is also an intimate and vital part of a piece of hardware, and has little meaning outside of that particular hardware.

FTP short for File Transfer Protocol.

GPS short for global positioning system. The Global Positioning System (GPS) is the only fully functional Global Navigation Satellite System (GNSS). Utilizing a constellation of at least 24 medium Earth orbit satellites that transmit precise microwave signals, the system enables a GPS receiver to determine its location, speed, direction, and time.

hop In computer networking, a hop represents one portion of the path between source and destination. When communicating over the Internet, for example, data passes through a number of intermediate devices (like routers) rather than flowing directly over a single wire. Each such device causes data to "hop" between one point-to-point network connection and another.

I2C short for inter-integrated circuit. $I^2C$ is a multi-master serial computer bus that is used to connect integrated circuits (ICs) I2C is a multi-master bus, which means that multiple chips can be connected to the same bus and each one can act as a master by initiating a data transfer. I2C is used in many devices, especially video devices such as computer monitors, televisions and VCRs. I2C uses two lines—SCL (serial clock) and SDA (serial data)—to allow any number of masters and slaves to talk together at 100 KHz or 400 KHz or 1 MHz. The rate isn't massive, but for non-bandwidth-critical applications like controlling LCDs and LEDs and accessing small memories and so on, it's pretty useful. The bus is a multi-master bus which means any number of master nodes can be present. Additionally, a master can also be a slave, and vice-versa. A master node can control the clock. A slave node is not in control of the clock line. Overall, there are four distinct modes of operation for a given bus device: master transmit, master receive, slave transmit, slave receive.

HTTP short for Hypertext Transfer Protocol. HTTP is a communications protocol used to transfer or convey information on intranets and the World Wide Web. Its original purpose was to provide a way to publish and retrieve hypertext pages.

IEEE Short for "Institute of Electrical and Electronics Engineers". The IEEE is best known for developing standards for the computer and electronics industry.

Iridium The Iridium satellite constellation is a system of 66 active communication satellites with spares in orbit and on the ground. It allows worldwide voice and data communications using handheld satellite phones. The Iridium network is unique in that it covers the whole earth, including poles, oceans and airways.

JMS short for Java Message Service.

LAN Local Area Network (LAN) is a data communication network spanning a relatively small area. Most LANs are confined to a single building or group of buildings. However, one LAN can be connected to other LANs over any distance, for example, via telephone lines and radio wave and the like to form Wide Area Network (WAN). More information can be found by at "Ethernet: The Definitive Guide" (O'Reilly& Associates) by Charles E. Spurgeon.

Latin A human language. Latin terms (abbreviations) may be used herein, as follows:

cf. short for the Latin "confer". As may be used herein, "compare".

e.g. short for the Latin "exempli gratia". Also "eg" (without periods). As may be used herein, means "for example".

etc. short for the Latin "et cetera". As may be used herein, means "and so forth", or "and so on", or "and other similar things (devices, process, as may be appropriate to the circumstances)".

i.e. short for the Latin "id est". As may be used herein, "that is".

sic meaning "thus" or "just so". Indicates a misspelling or error in a quoted source Lat, Long short for latitude, longitude. Latitude gives the location of a place on Earth north or south of the equator. Longitude is the east-west geographic coordinate measurement most commonly utilized in cartography and global navigation.

MAC Short for Media Access Control address. MAC is a hardware address that uniquely identifies each node of a network. In IEEE 802 networks, the Data Link Control (DLC) layer of the OSI Reference Model is divided into two sublayers: the Logical Link Control (LLC) layer and the Media Access Control (MAC) layer. The MAC layer interfaces directly with the network medium. Consequently, each different type of network medium requires a different MAC layer. On networks that do not conform to the IEEE 802 standards but do conform to the OSI Reference Model, the node address is called the Data Link Control (DLC) address.

The MAC Layer is one of two sublayers that make up the Data Link Layer of the OSI model. The MAC layer is responsible for moving data packets to and from one Network Interface Card (NIC) to another across a shared channel, and is part of the OSI model Data Link Layer (Layer 2). At the Data Link Layer (2), data packets are encoded and decoded into bits. It furnishes transmission protocol knowledge and management and handles errors in the physical layer, flow control and frame synchronization. The data link layer is divided into two sublayers: The Media Access Control (MAC) layer and the Logical Link Control (LLC) layer. The MAC sublayer controls how a computer on the network gains access to the data and permission to transmit it. The LLC layer controls frame synchronization, flow control and error checking. See PHY.

markup language A markup language provides a way to combine a text and extra information about it. The extra information, including structure, layout, or other information, is expressed using markup, which is typically intermingled with the primary text. The best-known markup language in modern use is HTML (HyperText Markup Language), one of the foundations of the World Wide Web. Originally markup was used in the publishing industry in the communication of printed work between authors, editors, and printers.

metadata Metadata is data about data. An item of metadata may describe an individual datum, or content item, or a collection of data including multiple content items.

Metadata (sometimes written 'meta data') is used to facilitate the understanding, use and management of data. The metadata required for effective data management varies with the type of data and context of use. In a library, where the data is the content of the titles stocked, metadata about a title would typically include a description of the content, the author, the publication date and the physical location. In the context of a camera, where the data is the photographic image, metadata would typically include the date the photograph was taken and details of the camera settings. On a portable music player such as an Apple iPod, the album names, song titles and album art embedded in the music files are used to generate the artist and song listings, and are metadata. In the context of an information system, where the data is the content of the computer files, metadata about an individual data item would typically include the name of the field and its length. Metadata about a collection of data items, a computer file, might typically include the name of the file, the type of file and the name of the data administrator.

MHz short for megahertz. Also "Mhz". A measure of signal frequency expressing millions of cycles per second.

Microcontroller A microcontroller (also MCU or μC) is a computer-on-a-chip. It is a type of microprocessor emphasizing self-sufficiency and cost-effectiveness, in contrast to a general-purpose microprocessor (the kind used in a PC). In addition to all arithmetic and logic elements of a general purpose microprocessor, the microcontroller usually also integrates additional elements such as read-only and read-write memory, and input/output interfaces. Microcontrollers are frequently used in automatically controlled products and devices, such as automobile engine control systems, office machines, appliances, power tools, and toys. By reducing the size, cost, and power consumption compared to a design using a separate microprocessor, memory, and input/output devices, microcontrollers make it economical to electronically control many more processes.

multiplexing In electronics, telecommunications and computer networks, multiplexing (short muxing) is a term used to refer to a process where multiple analog message signals or digital data streams are combined into one signal. The aim is to share an expensive resource. For example, in electronics, multiplexing allows several analog signals to be processed by one analog-to-digital converter (ADC), and in telecommunications, several phone calls may be transferred using one wire. In communications, the multiplexed signal is transmitted over a communication channel, which may be a physical transmission medium. The multiplexing divides the capacity of the low-level communication channel into several higher-level logical channels, one for each message signal or data stream to be transferred. A reverse process, known as demultiplexing, can extract the original channels on the receiver side. A device that performs the multiplexing is called a multiplexer (MUX), and a device that performs the reverse process is called a demultiplexer (DEMUX). The two most basic forms of multiplexing are time-division multiplexing (TDM) and frequency-division multiplexing (FDM). A multiplexing technique may be further extended into a multiple access method or channel access method, for example TDM into Time-division multiple access (TDMA) and statistical multiplexing into carrier sense multiple access (CSMA). A multiple access method makes it possible for several transmitters connected to the same physical medium or on the same transmit frequency to share its capacity.

Network Mask This is the way that the addressing/routing scheme is implemented. When a message is sent to a device the destination address is "anded" with the network mask and compared to the destination address. If equal, the message is travelling along the correct network path. See bitmask.

OSI Short for Open System Interconnection, an ISO standard for worldwide communications that defines a networking framework for implementing protocols in seven layers. Control is passed from one layer to the next, starting at the application layer in one station, proceeding to the bottom layer, over the channel to the next station and back up the hierarchy. Generally, the seven Layers are (7) Application, (6) Presentation, (5) Session, (4) Transport, (3) Network, (2) Data Link, and (1) Physical. Most of the functionality in the OSI model exists in all communications systems, although two or three OSI layers may be incorporated into one.

packet In information technology, a packet is a formatted block of data carried by a packet mode computer network. Computer communications links that do not support packets, such as traditional point-to-point telecommunications links, simply transmit data as a series of bytes, characters, or bits alone. When data is formatted into a packet, the network can transmit long messages more efficiently and reliably.

parent/child In a hierarchical data model, data are organized into a tree-like structure. The structure allows repeating information using parent/child relationships: each parent can have many children but each child only has one parent.

PC Short for "Personal Computer". A PC is a single-user computer based on a microprocessor. In addition to the microprocessor, a personal computer has a keyboard for entering data, a monitor for displaying information, and a storage device for saving data.

P2P short for Peer-to-Peer. A peer-to-peer (or "P2P", or, rarely, "PtP") computer network exploits diverse connectivity between participants in a network and the cumulative bandwidth of network participants rather than conventional centralized resources where a relatively low number of servers provide the core value to a service or application. Peer-to-peer networks are typically used for connecting nodes via largely ad hoc connections. Such networks are useful for many purposes. Sharing content files (see file sharing) containing audio, video, data or anything in digital format is very common, and realtime data, such as telephony traffic, is also passed using P2P technology.

PHY short for physical layer. The physical layer is level one in the seven-level OSI model of computer networking as well as in the five-layer TCP/IP reference model. It performs services requested by the data link layer. In a local area network (LAN) or a metropolitan area network (MAN) using open systems interconnection (OSI) architecture, the physical signaling sublayer is the portion of the physical layer that: (i) interfaces with the medium access control sublayer (MAC) which is a part of the Data Link Layer (ii) performs character encoding, transmission, reception and decoding, and (iii) performs mandatory isolation functions. The PHY in IEEE 802.15.4 manages the physical RF transceiver and performs channel selection and energy and signal management functions. It may operate at 2400-2483.5 MHz, with up to sixteen channels. See RF.

Protocol An agreed-upon format for transmitting data between two devices. The protocol determines the following:
  the type of error checking to be used
  data compression method, if any
  how the sending device will indicate that it has finished sending a message
  how the receiving device will indicate that it has received a message radio Originally, radio or radiotelegraphy was called 'wireless telegraphy', which was shortened to 'wireless'. In recent years the term 'wireless' has gained renewed popularity through the rapid growth of short range networking, e.g., WLAN ('Wireless Local Area Network'), WiFi and Bluetooth as well as mobile telephony, e.g., GSM and UMTS. Today, the term 'radio' often refers to the actual transceiver device or chip, whereas 'wireless' refers to the system and/or method used for radio communication. Hence one talks about radio transceivers and Radio Frequency Identification (RFID), but about wireless devices and wireless sensor networks.

RF Short for radio frequency. RF refers to that portion of the electromagnetic spectrum in which electromagnetic waves can be generated by alternating current fed to an antenna. Various "bands" are of interest here, including:
  Ultra high frequency (UHF) 300-3000 MHz used for television broadcasts, mobile phones, wireless LAN, ground-to-air and air-to-air communications
  Super high frequency (SHF) 3-30 GHz used for microwave devices, mobile phones (W-CDMA), WLAN, most modern radars
  IEEE 802.15.4 may use the 2.4 GHz public spectrum band, which is divided into several overlapping, staggered channels whose center frequencies are 5 megahertz (MHz) apart. See PHY.

RFID Short for "Radio Frequency Identification". An RFID device (sometimes referred to as a "tag") interacts, typically at a limited distance, with a "reader", and may be either "passive" (powered by the reader) or "active" (having its own internal power source, such as a battery).

Router A router is a device that extracts the destination of a packet it receives, selects the best path to that destination, and forwards data packets to the next device along this path. They connect networks together; a LAN to a WAN for example, to access the Internet. Some units are available in both wired and wireless models.

RS232 In telecommunications, RS-232 (Recommended Standard 232) is a standard for serial binary data signals connecting between a DTE (Data terminal equipment) and a DCE (Data Circuit-terminating Equipment). It is commonly used in computer serial ports.

RX short for receive, or listen. See TX

SAIL internal nomenclature. short for sensor rail

SBC short for single board computer. An SBC is a computer on a board, with hard drive, etc.)

Software Computer instructions or data. Anything that can be stored electronically is software. Software is typically stored in binary form (ones and zeros, represented by two distinctive states) on a storage medium, such as a floppy disc, hard drive, memory device, or the like, all of which may generally and broadly be referred to as "hardware". The apparatus or system or device which responds to software instructions or manipulates software data may generally and broadly be referred to as a "computer". Software may also be characterized as the non-hardware part of a computer, handheld (e.g., PDA) or smartphone ("smart" cellular telephone) consisting of instructions used to operate these devices. Includes applications that are added to, or included on, the device, as well as the operating system built into a device. Software is sometimes abbreviated as "S/W". Software is often divided into the following two categories:
  systems software: Includes the operating system and all the utilities that enable the computer to function.
  applications software: Includes programs that do real work for users. For example, word processors, spreadsheets, and database management systems fall under the category of applications software.

SQL sort for Structured Query Language. SQL is a computer language designed for the retrieval and management of data in relational database management systems, database schema creation and modification, and database object access control management.

TANGO Tango (or xTango) is internal nomenclature for the mesh network disclosed herein. Tango is built upon the physical and data link layers.

TCP/IP Short for Transmission Control Protocol/Internet Protocol. TCP/IP is the language governing communications between all computers on the Internet. TCP/IP is a set of instructions that dictates how packets of information are sent across multiple networks. It also includes a built-in error-checking capability to ensure that data packets arrive at their final destination in the proper order.

USB short for universal serial bus. USB is a serial bus standard to interface devices. A major component in the legacy-free PC, USB was designed to allow peripherals to be connected using a single standardized interface socket and to improve plug-and-play capabilities by allowing devices to be connected and disconnected without rebooting the computer (hot swapping). Other convenient features include providing power to low-consumption devices without the need for an external power supply and allowing many devices to be used without requiring manufacturer specific, individual device drivers to be installed. See RS232.

TX short for transmit, or send. See RX

WDN short for wireless data node. Also may be referred to herein as WSN (short for wireless sensor node). In the mesh network disclosed herein, there is generally one WDC (wireless data controller) for many WSNs. A WSN (or WDN) may be referred herein to as a Network Node (NN). The WDC may be referred to herein as a Network Controller (NC).

WindowsCE Windows CE (also known officially as Windows Embedded CE since version 6.0, and sometimes abbreviated WinCE) is a variation of Microsoft's Windows operating system for minimalistic computers and embedded systems.

WLAN Short for "wireless local-area network". Also referred to as LAWN. A WLAN is a type of local-area network that uses high-frequency radio waves rather than wires for communication between nodes (e.g., between PCs).

XML short for Extensible Markup Language. XML is a general-purpose markup language. It is classified as an extensible language because it allows its users to define their own tags. Its primary purpose is to facilitate the sharing of structured data across different information systems, particularly via the Internet. It is used both to encode documents and serialize data. In the latter context, it is comparable with other text-based serialization languages such as JSON and YAML.

ZigBee ZigBee is the name of a specification for a suite of high level communication protocols using small, low-power digital radios based on the IEEE 802.15.4 standard for wireless personal area networks (WPANs), such as wireless headphones connecting with cell phones via short-range radio. The technology is intended to be simpler and cheaper than other WPANs, such as Bluetooth. ZigBee is targeted at radio-frequency (RF) applications which require a low data rate, long battery life, and secure networking.

ZigBee protocols are intended for use in embedded applications requiring low data rates and low power consumption. ZigBee's current focus is to define a general-purpose, inexpensive, self-organizing, mesh network that can be used for industrial control, embedded sensing, medical data collection, smoke and intruder warning, building automation, home automation, etc. The resulting network will use very small amounts of power so individual devices might run for a year or two using the originally installed battery.

There are three different types of ZigBee device:

ZigBee coordinator (ZC): The most capable device, the coordinator forms the root of the network tree and might bridge to other networks. There is exactly one ZigBee coordinator in each network since it is the device that started the network originally. It is able to store information about the network, including acting as the Trust Centre & repository for security keys.

ZigBee Router (ZR): As well as running an application function a router can act as an intermediate router, passing data from other devices.

ZigBee End Device (ZED): Contains just enough functionality to talk to its parent node (either the coordinator or a router); it cannot relay data from other devices. This relationship allows the node to be asleep a significant amount of the time thereby giving you the much quoted long battery life. A ZED requires the least amount of memory, and therefore can be less expensive to manufacture than a ZR or ZC.

SUMMARY OF THE INVENTION

It is a general object of the invention to provide improved techniques for operating wireless data networks, such as mesh networks, such as (but not limited to) an IEEE 802.15.4 network.

The present invention is generally directed to solving various problems, which are not (or have not adequately been) addressed by the prior art, such as:

being able to put network devices in an RF quiet mode (no beaconing)

powering the network devices with small batteries, and having long life (2 years+)

reconnecting with devices as they move around or have their signal blocked having only one "full function device" (NC or WDC) per network capability of connecting sensors and the like to the "reduced function devices" (NN, SDN, WSN)

According to an embodiment of the invention, generally, a meshing network (xTango) is disclosed that is RF quiet capable with very low power consumption and the ability to quickly heal itself and create new network paths.

According to an embodiment of the invention, generally, a network addressing scheme is disclosed that allows for each node (NC, NN) to not have a network map (and without a routing table), but still be able to route messages.

According to an embodiment of the invention, generally, a piping scheme is disclosed that will allow a mesh to become a high throughput network.

According to an embodiment of the invention, generally, a "sensor rail" (SAIL) protocol definition is disclosed that will allow sensor devices to connect to Wireless Data Nodes (WDNs, also referred to herein as Wireless Sensor Nodes, or WSNs), and route messages through the xTango network.

According to an embodiment of the invention, in a wireless network comprising a network controller (NC) and a plurality of network nodes (NN) arranged hierarchically, from a first group (GR1) which is closest to the NC to a last group (GRn) which is farthest from the NC, a method of operating the network comprises: providing a Sleep/RF Quiet mode of operation, wherein the NC does not send out sync messages; and providing a Network Running mode of operation, wherein the NC sends out sync messages. A pipeline mode of operation may be provided, wherein the WDC and one of the network nodes set up a pipeline, from the NN to the NC, through any intermediate NNs. In the network running mode, a slow sync mode may be provided when all devices that should have reported in have reported in, otherwise the network may enter a fast sync mode.

According to a feature of the invention, a data frame comprises: a sync period followed by at least one data period; and a first portion of the sync period is divided into a plurality of sub-periods for downstream synchronization, and a second portion of the sync period is divided into a plurality of sub-periods for upstream requests. In a Sleep/RF Quiet mode, a NN may listens periodically, such as every 5 minutes for 5 seconds, for a synchronization message from the NC and, if there is no sync message, go back to sleep. As time goes by, and no sync messages are detected, the NN may back off, (such as in 15 second increments) until it is sleeping most of the time. The backing off may be adjusted dynamically, either by the NC or by the NN itself.

According to a feature of the invention,
(a) the sync message sent by the NC specifies that it is a parent in Group 0;
(b) when the sync message is received by a NN in the first group, which is a child of the NC, the NN modifies the sync message to indicate that it is parent in the first group, and resends the modified sync message;
(c) when the modified sync message is received by a NN in a next group, which is child to a parent in the previous group, the NN in the next group modifies the sync message to indicate that it is parent in the following group, and resends the modified sync message;
(d) repeating the step (c) until the sync message is modified and sent by a next to the last group; and
(e) when the sync message is received by a NN in the last group, an upstream request portion of the sync period opens up for NNs to send requests to send data to the NC.

According to a feature of the invention, sync messages are send out in a sync period; the network is set up to accommodate a number G of groups; the sync period comprises at least 2×G sub-periods (SPs); a first portion of the SPs are allocated for downstream synchronization; and a second portion of the SPs are allocated for upstream requests. For data transmission,
(a) the NC is designated as Group 0 (Gr0)
(b) in a first SP of the first portion of the SPs, the NN device in GR0 transmits, and the NN devices in Gr1 listen;
(c) in a next SP of the first portion of the SPs, the NN devices in GR1 transmit, and the NN devices in GR2 listen; and
(d) repeating the step (c) until the last group GRn is reached.
(e) in a first SP of the second portion of the SPs, the NN devices in the last group GRn transmit, and the NN devices in the next group (GRn−1) closer to GR0 listen;
(g) repeating the step (e) until the NC (GR0) is reached.

According to a feature of the invention, data messages are send out in a data period; the network is set up to accommodate a number G of groups; the data period comprises at least 2×G sub-periods (SPs); the NNs are arranged in EVEN-numbered and ODD-numbered groups; the NNs in the ODD-numbered groups listen for transmissions from the NNs in the EVEN-numbered groups in two consecutive SPs; and the NNs in the EVEN-numbered groups listen for transmissions from the NNs in the ODD-numbered groups in two consecutive SPs. A SP before and a SP after the two consecutive SPs may be allocated for the NNs in the respective ODD-numbered or EVEN-numbered group to prepare and continue to listen to the NNs in the respective EVEN-numbered or ODD-numbered group According to a feature of the invention, sensors may be associated with at least some of the NNs; and data packets may be formatted in a markup language (such as XML) which allows for the ability to dynamically change or update messages. This protocol may be used to discover sensors, control those sensors, configure those sensors and report addressing and sensor events back to the NC.

The wireless network may comprise a meshing network, and may be based on IEEE 802.15.4.

Generally, the devices (NN and NC) may be synced in a manner that their radios dos not have to be up very often.

According to another aspect of the invention, in a wireless network comprises a network controller (NC) and a plurality of network nodes (NN) arranged hierarchically, from a first group (GR1) which is closest to the NC to a last group (GRn) which is farthest from the NC, a method of operating the network comprising: providing a pipeline mode of operation wherein when the NC requests a pipe to the NN, and it is built from the NN to the NC on the next frame.

According to another aspect of the invention, in a wireless network comprising a single network controller (NC) and a plurality of network nodes (NNs): an addressing scheme permits network nodes (NNs) to route messages without a network map. All of the network timing information may be sent out on the sync message.

The various features disclosed herein may be used in various combinations with one another.

It should be understood that the techniques disclosed herein are applicable to operating a mesh network with any wireless technology—for example, Bluetooth, Wireless USB, FM Radio, etc.

Some exemplary practical applications may include, but are not limited to:
Tracking vital signs and the location of miners
Tracking containers on ships.
Sensors on Aircraft—RF Quiet makes getting FAA certification easy—network goes into quiet mode.
Tracking firefighters in buildings.
City wide low power networks for traffic
Containers full of parts may include, for example, aircraft parts distributed in a very harsh environment (lots of RF, lots of movement, potential interference from moving obstacles, etc.), and in situations where it is critical to keep track of inventory (parts), and environmental factors that the parts are exposed to, such as temperature, g-force, etc.

The mesh network disclosed herein is infrastructure free, and very low power. This may be very advantageous in dynamic environments, providing better read rates than conventional readers. Location information (such as GPS) can be included, so that you can figure out where things are.

Other objects, features and advantages of the invention will become apparent in light of the following description thereof.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

In the drawings accompanying the description that follows, both reference numerals and legends (labels, text descriptions) may be used to identify elements. If legends are provided, they are intended merely as an aid to the reader, and should not in any way be interpreted as limiting.

FIG. 18A is a diagram showing message flow for a message originating at a sensor device, according to an embodiment of the invention. FIG. 18B is a diagram showing the sequence for an inbound message from the network, according to an embodiment of the invention.

DETAILED DESCRIPTION OF THE INVENTION

Figure 1:
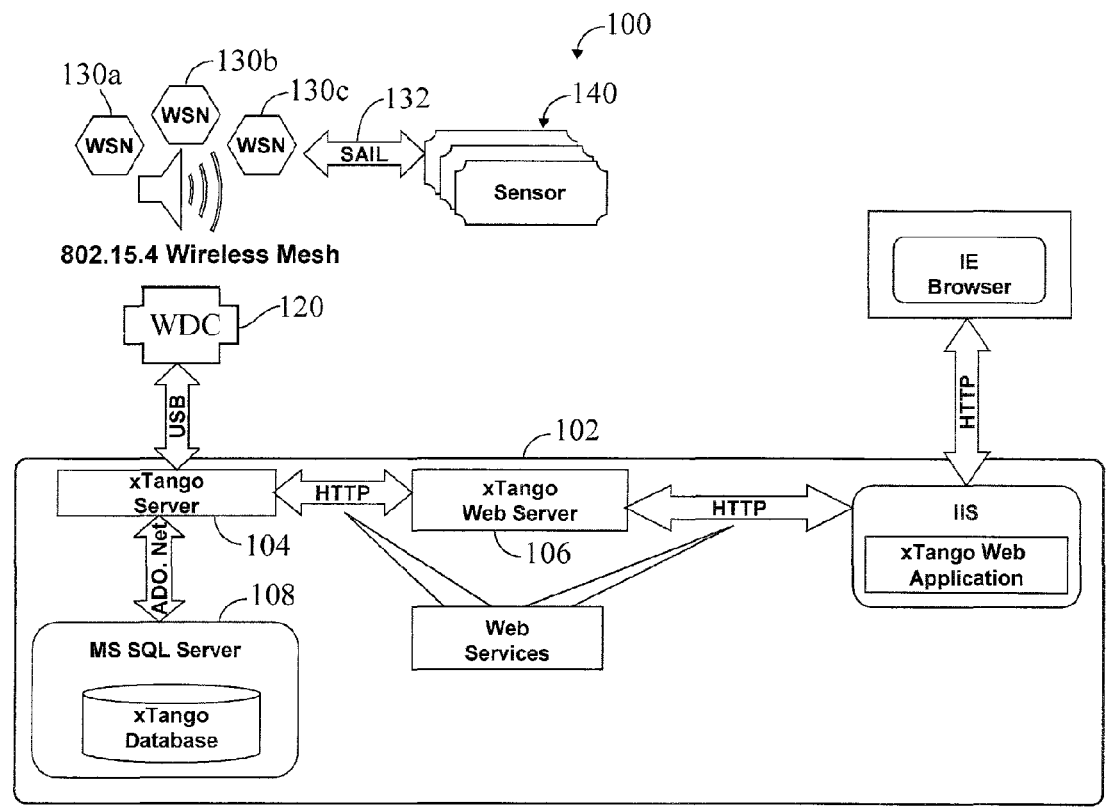
FIG. 1 is a diagram of a wireless data network, according to an embodiment of the invention.

In the description that follows, numerous details are set forth in order to provide a thorough understanding of the present invention. It will be appreciated by those skilled in the art that variations of these specific details are possible while still achieving the results of the present invention.

An example of a mesh network will be discussed in detail, hereinbelow. Generally, the mesh network comprises a single Network Controller (NC), which may also be referred to as a wireless device controller WDC, and a plurality of Network Node (NN) devices, which may also be referred to as Wireless Sensor Nodes (WSN) or Wireless Device Nodes (WDN).

A NN (WDN, WSN) always has only a single parent. A NN (WDN, WSN) may act as parent to several other NNs (WDNs, WSNs). The NNs (WDNs, WSNs) may be arranged in groups (GR), hierarchically, from a first group (GR1) closest to the NC (WDC) to a last group (GRn) farthest from the NC (WDC), and intermediate groups (GR2, etc.) located logically (and often also physically) therebetween. For example, a GR1 WDN can be parent to several GR2 WDNs. The NC (WDC) may be considered to be group zero (GR0). The NC (WDC) may be parent to several GR1 WDNs. There may, for example, be a total of 30 groups. A NN in Group 30 would not be parent to any other NNs, since it is at the "end of the line".

A communication frame is described which comprises at least a sync period and a data period. Sub-periods of the sync and data periods are discussed. Generally, there are approximately twice as many sub-periods as there are groups, which allow for sync and data messages to be propagated downstream, from the WDC to the WDNs in the farthest group (GRn), and upstream from WDNs in the farthest group (GRn) back up to the WDC, with a few "buffer" SPs at the beginning and end of the downstream and upstream portions.

A General Overview of the System

Mesh networks of the prior art are typically what is referred to as "beaconing networks", which means that a device comes up and beacons, querying whether there is an existing network set up (within range) that they can talk to (exchange data with). And the devices connect themselves up.

In contrast thereto, in the mesh network disclosed herein, a single signal is sent out be a wireless device controller (WDC, also referred to as Network Controller (NC)), in a "wave", to wireless device nodes (WDNs, also referred to as wireless sensor nodes, or "WSNs", also referred to as Network Nodes (NNs)).

Generally there is a single NC and a plurality of NNs. The NNs may be arranged in Groups (GRs), fanning out from a first group (GR1) closest to the NC (and server), to a group (GRn) farthest from the NC. A given NN can act as parent to one or more other child NNs. Each of those NNs may act as parent to other NNs. The parent NN will be in a Group (GRx), and its children will be in the next group (GRx+1). The NC itself is parent to the GR1 NNs, and may be designated "Group 0".

A sync signal originates at the NC and goes (propagates) from NN-to-NN, in a wave-like downstream manner, and as the signal reaches each NN, that NN modifies some of the data (such as what group it is in, and who its parent is) and sends it along on a very stringently timed basis. The sync signal makes its way, through NNs, modified each time (each NN acts like a "router"), until the last group is reached, in a wave-like manner.

An object of the network architecture disclosed herein is to be able to stop activity, going into a mode of "radio silence", until the WSNs are directed to communicate again.

An overriding goal is for the network to be in a "speak when spoken to" mode. RF quiet may (must, if RF quiet is required) be the default state. All operations of transmitting are under the control of the master (WDC, NC) device. Even if there is something wrong with the system the devices (nodes, NN, WDN, WSN) should not go into transmit mode.

Transmit (TX) and Receive (RX) are the greatest power consumers. The less transmitting and receiving that is done, the longer the batteries will last. Therefore, the amount of communications that the NNs (WDNs, WSNs) do is kept to a minimum.

Another object of the network architecture disclosed herein is to reduce power consumption at the devices (WSNs, WDNs), and extend battery life. Generally, the radio in the device is the biggest power drain on the devices. Because of the synchronization in the wave flowing, the devices know when they have to be on the network to intercept a signal and move it along. The rest of the time, they can be in a sleep mode. Therefore, the devices can be extremely low power.

For example, three devices (WDNs) are connected in the mesh. Each device is in a Group, starting from a group closest to the WDC to a group farthest from the WDC. Each device knows when to wake up, because the devices have already been synched up, and that information is contained on the last (previous) message that came from the WDC.

A sync signal is sent out by the WDC. When the signal reaches the first device (WDN1), the device will pick it up. The device (WDN1) knows that it is in Group 1 (GR1), and it knows that it has to send it out according to a randomising scheme. The device (WDN1) changes the message slightly (such as Group number and parent ID), and moves it along (transmits it). The next device (WDN2) knows from the previous sync message to wake up at the correct time to pick up the message, edit it, and pass it along to the next (third) device, and so on, until the last device (WDNn, in this example WDN3) has been reached. Then, halfway through the overall synch period, things turn around, messages are now sent upstream back to the WDC, in the same manner, from the farthest device (WDNn) to the closest device (WDN1) to the WDC, then to the WDC.

In the prior art mesh networks referred to above, a device will beacon, another device will pick up its beacon, they will figure out what to do (according to established protocols), they can communicate between each other, and they set up "routing tables". (A routing table is like a roadmap of the network. A message intended for a device has to contain information about how to get there—in other words, through which devices in the network.) The routing tables are sent along within the messages, so it can be seen that as more devices are added to the network, the message gets larger and larger, and the routing table represents more and more overhead in the message (leaving less space for data, or requiring longer messages).

The message (with routing table) has to make its way around the network, even when devices are moving around, and the network is reconfiguring itself. A problem with this is that, if a device becomes missing (through interference, or other reasons), the message does not get through, because the routing table is fixed.

In contrast thereto, in the network architecture disclosed herein, the actual address of the device is kind of a bitmask. When a message comes back upstream, the bitmask is changed, so that when the next sync message is sent out, the message knows how to route through the network, automatically. (This latency of one sync period is not a problem, because the main server will only send data out to devices that have reported in.) Each device performs a bitmask comparison against what the definition is, and if it is part of its mask, it is sent out.

Thus, there is a way to do a network routing map in four bytes (currently an 4 Byte Unsigned Integer, long but can be up to 8 bytes (unsigned 64 bits) for large networks), without the need to increase message size, and without the need to send a fixed routing table. In an exemplary situation where there is a one second sync period followed by one or two one second long data periods, this means that as devices move around, they can be correctly found in two or three seconds, because of the messages going upstream in the network. So, the network is able to reconfigure itself, and is able to route messages much faster because of the addressing scheme.

The previous paragraphs are descriptive of a normal mode of network operation. Sometimes, it may become necessary for a given device to send a lot of data to the WDC, or vice-versa. In a pipeline mode, because of the way that the network functions, with the downstream syncs and the upstream syncs, a pipe (logical/physical connection) can be established (if needed) between the WDC and a network node (device), through other devices, that pops into the network, and then it is basically a throughput straight to that given device, through the network. Meanwhile, all other devices are set to not send messages (they go to sleep) or, if they are in the pipe, to simply pass the pipeline message along. At the end of the pipeline message, the network resyncs itself and resumes normal operation. (Pipe periods are data periods in the communication frame. If there are 2 data periods in the frame, the pipe will stay open for 2 periods.) This pipeline mode of operation allows for more information to go through the mesh than can normally be done.

In the descriptions that follow, some examples of hardware are set forth. These should be considered and regarded as exemplary, and not as limiting the invention to a particular hardware (or firmware, or software) configuration. It is within the scope of the invention that other hardware configurations could be used to implement the wireless data networking techniques disclosed herein.

General Comments

There is disclosed an example of a low power, always connected, wireless and infrastructure free mesh network system, which may be implemented on top of the 820.15.4 IEEE protocol, having one or more of the following features:

1. The network allows any communications device (hereafter referred to as "device" or "devices") to participate in a communications "mesh".
   a. A mesh is defined as one or more devices that wish to communicate with each other or each other and a central point or a central point and each other for the purpose of exchanging data.
      i. Data is defined as information that is important to the completion of some sort of process such as (but not limited to) the notification from a sensor that a certain criteria has been met.
   b. A communications device is specified as any device that has a processor and a means of communications not limited to: a transceiver, a wired connection, a light connection, etc, or a device that has a means of communication internally combined with a processor.
      i. A processor is defined as (but not limited to) a microcontroller that has associated firmware (software) that runs code that implements the xTango protocol and associated timing.
      ii. A transceiver is defined as any radio device that has 2 way capability—i.e. is able to send known data and reconstitute it at the receiving end. No specification of radio throughput is specified.
      iii. A wired connection is defined as (but not limited to) a connection that allows signals to flow in such a manner that data is transferred between a sender and a receiver, or multiple senders and a receiver, or a sender and multiple receivers.

iv. A light connection is defined as (but not limited to) a connection that allows signals to flow in such a manner that data is transferred between a sender and a receiver, or multiple senders and a receiver, or a sender and multiple receivers.

2. An implementation is provided for validating that data packets received and transmitted through the mesh are correct.

3. A process is provided to cause the "mesh" to stop communicating and have all devices in the mesh stay quiet until the mesh is once again ordered to start communicating.

4. An implementation is provided that removes the need for network routing tables commonly found in most mesh network implementations.

5. An implementation is provided that allows mesh devices to limit power consumption.

6. A process is provided to take into account the limited power consumption and still make the mesh responsive to device discovery and operation.

7. An implementation is provided that allows for easy extension of network control and data messages. (send messages around in XML format (similar to how things are done in the SAIL interface), which allows devices to change things on the fly, and the devices can parse the messages)

8. A process is provided that will allow devices in the mesh to increase throughput with decreasing power consumption for other devices in the mesh.

General Description of the Network

Downstream means from the WDC outbound through the network to the farthest device. Upstream means from the farthest device through the network to the WDC.

Parent means the device directly upstream of the device. Children mean any devices downstream of the device. Parent to child is a one to many relationship, child to parent is a one to one relationship.

This network may only use the frequency and modulation specification of an 802.15.4 network. No MAC layer functionality will be used. This will allow for larger network packets (up to 23 bytes) because the MAC addressing space will not be used.

No downstream device will transmit without first successfully receiving a sync message. Sync messages may be sent every 3 (e.g.) seconds in "fast" and "discover" mode and every 5-9 seconds (e.g.) in "slow" sync mode. The mode is controlled by the WDC (NC).

The sync message contains enough information to let all downstream devices know when to send data, when to send upstream syncs, and when the next sync message will arrive. All messages are described in detail below.

If a device does not hear a sync message downstream for 3 (e.g.) sync periods it may assume that it is out of the network and will go into the "lost" mode.

Each device will recognize the network poll frequency and send it's network mask answer to it's parent within that period. Any children of the device that send a network mask message will have their message also propagated to the parent.

Each child will keep track of it's parent for upstream messages.

Each data message downstream will be acknowledged by the destination child device back to the WDC. Each message upstream will be acknowledged by the parent back to the child during the next data sending period.

If a mesh network is not communicating data, and is in slow sync mode, each device will be in communication mode for (for example): 2 periods upstream sync listen, 1 period downstream sync send, 2 periods downstream sync listen. This works out to 5 periods of communication time and 576 periods of "timer" time which works out to a duty cycle of 0.86%

This network may operate on 4 different 2.45 ghz channels—5, 20, 25, 26

It takes approximately 32 micro seconds to send one character. Sending a full packet (127 bytes) takes 4064 micro seconds or a little over 4 milliseconds, allowing 2 full packets to be sent per time slot of $\frac{1}{100}$ of a second. (At a given rate, more data can be sent in $\frac{1}{64}$ of a second than in $\frac{1}{100}$ of a second. Generally, in the description that follows, both sync and data periods are divided into 64 sub-periods (SPs)).

There is also disclosed herein sensor interface and protocol, referred to as "SAIL". Most sensor interfaces and protocols are not dynamic. Some features that are incorporated in SAIL, to make it dynamic, include the following:

Data packets are formatted in XML, which allows for the ability to dynamically change or update messages. For example, a sensor can make a change to a message which does not damage anything upstream. This provides a way for sensors to be upgraded, to change as they go forward, and not damage anything upstream in the network. Also, because it is XML, the sending device (NN) does not need to understand the message. It only needs to wrap it in "Tango" XML and deliver it upstream to the NC. Because of the flexibility of XML the message can be parsed successfully by the receiving NN/NC.

The NN uses the SAIL protocol to discover sensors on the I2C bus, control those sensors, configure those sensors and report addressing and sensor events back to the NC. This is different than a basic I2C system that has fixed addresses that the controlling device needs to understand. SAIL is a simple way for sensor developers to include their sensors into a mesh network.

Overall System Block Diagram

FIG. 1 illustrates an embodiment of a wireless network system. A computer 102 comprises an xTango (internal nomenclature) server 104, and may also comprise an xTango (internal nomenclature) web server 106 and a MS SQL server 108, interconnected as illustrated.

The xTango server may be connected, such as by a USB interface, to a wireless data controller (WDC) 120, which is at the "center" of a wireless mesh network comprising, for example, a plurality (3 shown) of wireless device nodes (WDNs) 130a, 130b, 130c (generally referred to as "130"). The WDNs 130 may also referred to herein as wireless sensor nodes (WSNs). The WDNs (or WSNs) may also simply be referred to as "devices", and the WDC may also be referred to as a device.

The xTango server 104 is the communications gateway between the wireless mesh and all other systems.

A WSN 130 may comprise a radio to communicate with other WSNs 130 in the mesh (and, if necessary, with the WDC 104), a processor to do internal processing, EEPROMs for storing information such as inventory information, internal sensors and a bus connector for connecting external sensors.

Each WSN 130 may have its own internal sensors, and may additionally be connected via a SAIL (internal nomenclature) physical connection 132, such as a standard I2C (inter-integrated circuit) connection, with a plurality of external sensors 140. The sensors may detect, for example, environmental conditions (such as temperature, humidity, etc.), physical conditions (such as shock, g-force, etc), biological conditions, chemical conditions, switch statuses (such as door open), and the like.

Figure 2:
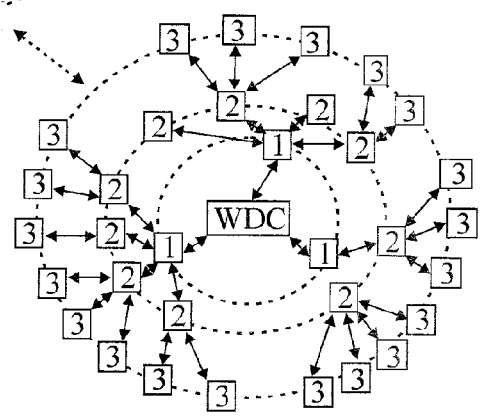
FIG. 2 is a diagram illustrating how a plurality of wireless data nodes (WDNs) may be arranged in Groups (Gr), in a wireless network environment such as that of FIG. 1, according to an embodiment of the invention.

FIG. 2 illustrates a wireless mesh comprising one WDC interacting with a plurality of WSNs. The WSNs are arranged logically in groups, numbered 1-30. The WDC, which may be considered to be Group 0 (Gr0), is shown communicating with three Group 1 (Gr1; in the figure, simply "1") devices. The Gr1 devices are "children" to the "parent" WDC.

The WDC (wireless device controller) may sometimes be referred to herein as NC (network controller). The WSNs (wireless sensor nodes) or WDNs (wireless device nodes) may be referred to herein as NNs (network nodes). The NNs are arranged logically (and sometimes physically) in groups. There is one NC for all of the NNs shown in FIG. 2. The NNs may be connected with sensor devices (see 140, FIG. 1).

Figure 3:
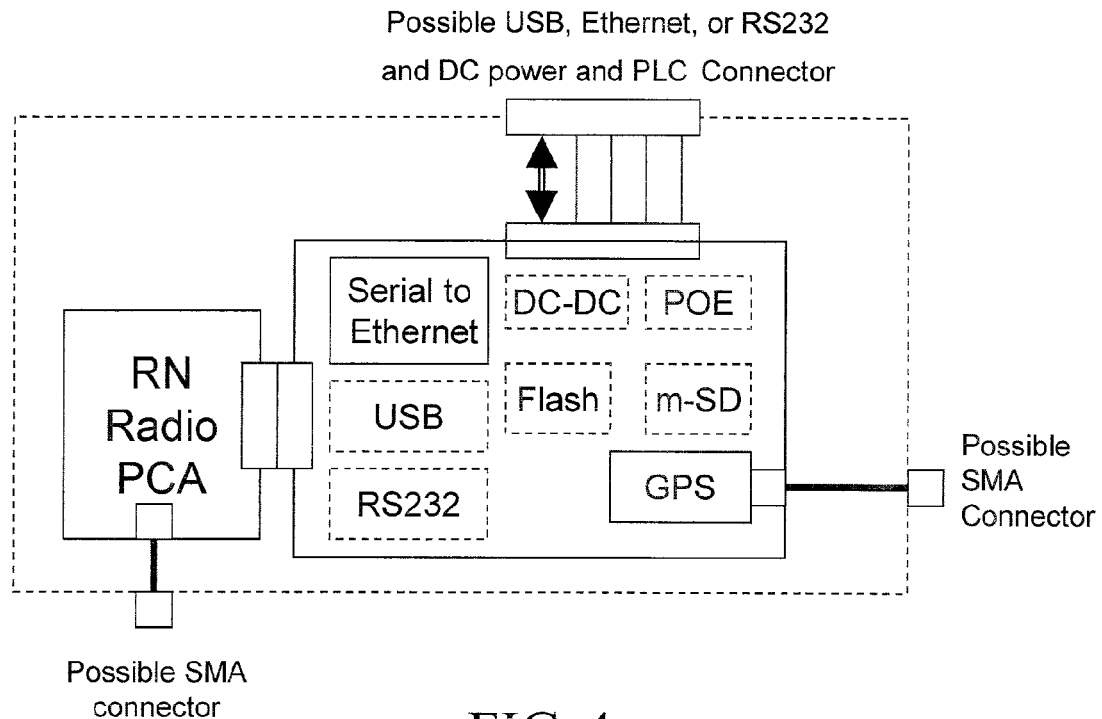
FIG. 3 is a diagram showing a block diagram of a wireless data controller (WDC, also referred to simply as network controller (NC)), for the exemplary network described hereinabove.

FIG. 3 is a diagram of an exemplary WDC.

Figure 4:
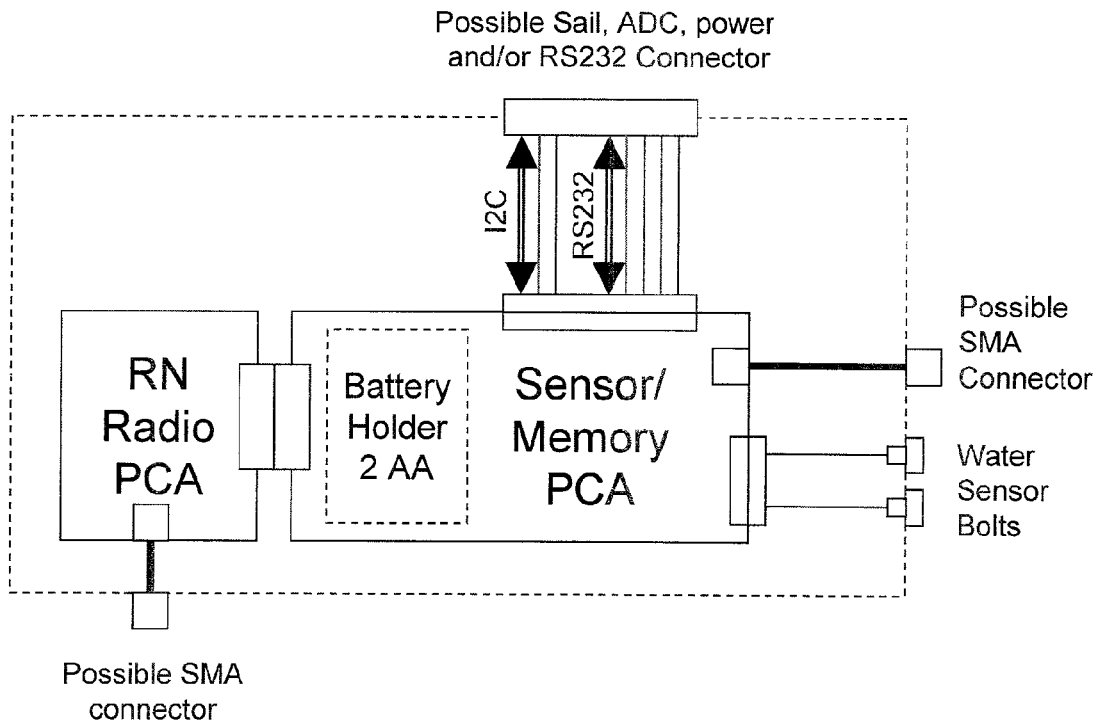
FIG. 4 is a diagram showing a block diagram of a wireless data (or sensor) node (WDN or WSN, also referred to simply as network node (NN), for the exemplary network described hereinabove.

FIG. 4 is a diagram of an exemplary WSN.

Each of the Group 1 ("1") WSNs may communicate with and act as a parent to a number of Group 2 (Gr2, or simply "2") child devices. In turn, each of the Group 2 devices may act as a parent to a number of Group 3 (Gr2, or simply "3") child devices, and so forth, up to devices in a 30$^{th}$ group.

Group 1 (Gr1) is hierarchically "closest" in the communication link to the WDC (Group 0), and Group 30 is hierarchically "farthest" from the WDC. Generally, each group represents a "hop" in the communication link.

As the devices hook up, and establish the network, the Group 1 devices may also tend to be those which are physically closest to the WDC, and the Group 30 devices may tend to be those which are farthest away from the WDC, but the devices may establish a plurality of groups even if all of the devices (WSNs) are within radio range of the WDC. Physically, the limitations of a radio link in 802.15.4 is approximately 50 meters. If there are only a few devices within close proximity to the WDC, there may well only be one group. If a device is farther away from the WDC than 50 meters, and there are devices in-between, it is inevitable that there will be more than one group.)

The number of groups is basically a tradeoff. The number of groups equals the number of hops. And, each hop represents a limit to the physical separation (such as 40-50 meters) between devices. (In practice, there may be limitations on the distance, due to signal obstructions, etc.).

More groups will give more physical coverage, but more groups means that you need to divide the sync period up into smaller pieces. Smaller pieces of the sync period imposes a limit on the number of device that can be in the same group, because all the devices in the same group utilize the same sub-period (SP).

You may want to cut down the number of devices that can sit on the group. A lot depends on the type of environment, such as whether there needs to be a lot of devices close together, or a few devices far apart.

A given device knows when it is supposed to see a sync message from a parent. Most of the time, the device is simply monitoring messages and, if it is parent to another device(s), passing messages downstream to its children.

When a device misses some sync messages, this indicates that it is "lost", and it will open up its radio and find another parent which may be the WDC, or another entirely different device (new parent) than it was previously connected to.

The lost device will wait a predetermined number (such as 2) sync periods (a sync period may be, for example, 5 seconds), will pick up a new parent, and send out its sync message so that its children can be connected up. When the device hooks up to the network again, it will send a message upward, via the new parent, which goes all the way back to the WDC, which resets the network addressing scheme.

Mesh Network Protocol, Generally

The mesh network protocol disclosed herein generally provides for:

Low Power (much lower than a typical ZigBee)

Always available Mesh. Resilient to RF environmental changes, dynamically re-routing using a different mesh route in seconds, not minutes.

High Data Throughput using Data Piping (when needed)

RF Quiet in ~2 to 9 seconds; no RF output from any device until the user turns the system back on. This may be accomplished by simply requesting through the CLI (client level interfaces) or Web Services that the network be turned off. (This tells the WDC to stop sending out sync messages, and all the WSNs go to sleep (RF quiet)).

The default state for all of the devices (WSNs and the WDC) is no transmit, listening for a sync. Once a sync is detected, the device will send out a sync and try to bring up its children. A sync signal will not be propagated until a sync signal from a parent device has been received, and understood.

Network packets use small footprint XML making easy porting from one μProcessor to another.

Overall bandwidth may be approximately 128 kbs, providing a data rate through the network that is equivalent to a 9600 baud modem.

Single Mesh Network can support up to 300 network nodes, with the exemplary frame setup disclosed herein. With a different frame setup, the network could support many more (thousands) of devices.

The mesh network disclosed herein may be extended to a multi-level mesh having the capability to support multiple mesh networks, thus allowing a much greater number of network nodes broken into logical mesh networks all inter-operating and communicating as though it were one large mesh.

Network Message Samples

<sl w="18411021" x="00004eb7" s="25" i="0" t="addr" d="00000001"/>

<sl w="18228141" x="00000000" s="12" i="F" t="wdnfound" d="found"/>

The above are two samples of SAIL messages (messages from sensors to the WSN), but the spirit of the Tango XML network messages are clear. Small node names, small attribute names small data values.

802.15.4 allows for a total of 128 bytes per network packet and there is never a network message greater than 128 bytes.

Components

| | |
|---|---|
| WSN: | short for Wireless Sensor Node |
| WDC: | short for Wireless Data Controller |
| RDC: | short for Remote Data Controller |
| AAWN: | short for Always Available Wireless Node |
| XTango Server: | Windows/Windows CE server application used to control and communicate with the Tango mesh network |

Wireless Sensor Node (WSN)

FIG. 4 shows exemplary hardware for a WSN (WDN, NN). The WSN is generally a low power low cost 802.15.4 mesh network data node.

The WSN services sensor devices, retrieving the sensor data and delivering the sensor data from the WSN to the xTango Server using the Tango Network in the form of a SAIL (internal nomenclature. short for sensor rail) message.

Some features of the WSN may be:
- The WSN may use a low cost Atmel μProcessor. (AT-MEGA644)
- The WSN may use a tightly integrated Atmel 802.15.4 radio transceiver (AT86RF230)
- Current WSN PCB dimensions: 1.25"×2.00", onboard low cost antenna or external patch antenna
- Current Range: ~300 feet
- Current Operating Temp Range: −20° C. to 85° C.
- May have standard 1 MByte of Memory or up to 8 MByte of memory
- May be configured with DEBUG LED's, JTAG connector, SAIL Connector WSN Power Calculations
  WSN Power usage may be governed by several different externally available parameters.
    Number of Synch Periods versus Data Periods
    Network Up Time versus Network Sleep Time
    Sensor Sample Rate and Sensor On Time
  Parameters are defined in the Firmware
  Usage Scenario Profiles are created allowing a network of WSN's be configured to meet a specific deployment usage goal/requirement
  Usage scenario worksheet provided to help system integrator design a configuration to suit the deployments requirements.

WSN Firmware
  Firmware hosts the algorithms for the WSN to connect to a peer WSN or the WDC controller.
  Each node has a unique 64 bit address, firmware encodes a WSN parent address into the base address thus conserving space and allowing for no more than two levels of invalid routing.
  Firmware manages the sensor I2C bus, up to 32 sensors.
  Firmware based on Open Source TinyOS however highly modified and now known as PivOS.
  Firmware optimized for low power using μProcessor sleep modes, on board RTC and wakeup interrupts all for low power consumption.
  Firmware is modular allowing reuse over different radio chips as well as different Protocols (802.11, etcetera)
  Firmware hosts small footprint portable XML parser. Parser supports XML elements and attributes. It does not support namespaces or schemas. XMLLite runs on any 8 bit μProcessor or above that supports the C programming language. XMLLite is a single pass parser so it is VERY FAST and very small.
  Firmware allows sensor SAIL events be cached even when the WSN is in RF quiet mode. No Sensor events are lost.
  Firmware reports firmware version as part of the Network Map message.
  Firmware has RTC relative tick count for network clock synch features. Approx every twenty minutes the Tango Network sends a clock synch message to ALL nodes in the mesh.

WSN/WDC Clock Synch Architecture
  The WDC and WSN each have a real time clock (RTC) counter that is set to zero at hardware or software reset.
  Every twenty minutes the xTango Server (or upon RDC wakeup) will send a relative to the xTango Server/RDC tick count. All nodes will have a timestamp relative to the controller. In the case of the RDC the timestamp is garnished from the GPS, the xTango Server gets the timestamp from the Operating System.
  Upon reset of the WSN node for any reason the counter is reset to ZERO which is an invalid timestamp value. If the xTango Server or RDC receives a SAIL event with the timestamp of ZERO it resets it to the current timestamp and forwards the message. The network will of course be back in synch within twenty minutes, at which time the SAIL event timestamps are actual event timestamps.

WSN Firmware Build Environment
  Builds on a Windows Workstation configured with:
    AVR Studio—Free from Atmel
      Builds standard Intelect HEX for either DataPipe™ firmware upgrade or upgrade via JTAG programming.
    GNU Embedded C/C++ Compiler with AVR extensions—Free from Open Source Community
    Cigwin UNIX C-Shell environment—Free from Open Source Community
    Firmware based on TinyOS (www.tinyos.net): has been significantly enhanced by Phase IV Engineering now known as PivOS
    Use Subversion and TortoiseSVN configuration management user interface—Free from Open Source Community
    Use Gemini Defect Tracking System (www.countersoft.com) for defect tracking, version release management and project management.

Wireless Data Controller (WDC)
  FIG. 3 illustrates an exemplary hardware configuration for the WDC (NC)
  As used herein, the WDC is a wireless network gateway with the following capabilities:
    View status of mesh network
    Start, Stop and Discovery the mesh network
    Establish data pipes from the WDC to any one node in the network
  The WDC connects via RS232 or USB to the controlling computer (xTango server). A similar remote data controller (RDC) can connect to the xTango server through the Iridium satellite network.
  Generally, there is one WDC per basic mesh, which may have hundreds (or thousands) of nodes (WDNs, WSNs).
  The WDC Hardware may have the following features:
    the WDC may use a low cost Atmel μProcessor (AT-MEGA128)
    WDC may use a Chipcon 802.15.4 radio transceiver (CC2420)
    the WDC may comprise an onboard low cost antenna or external patch antennae
    Current Range: ~300 feet
    Current Operating Temp Range: −10° C. to 65° C.
    Uses USB or RS232 Daughter Board for connectivity to PC or Single Board Computer
    Supports Tremble GPS receiver for WDC Lat/Long positioning
    Up to 128 kByte of memory
    the WDC may use the WSN PCB and Radio hardware with a redesigned—RS232/USB daughter board which will support up to 8 MByte of memory WDC Firmware
  The WDC and WSN (or WDN) are similar "devices". The WDC firmware is therefore similar to the WSN firmware, except it needs to include either an RS232 or USB communication driver (or the like) to allow for communications with the xTango Server.
  The WDC Firmware may use PivOS, and may include all of the features and functions of the WSN.
    Firmware to control overall network functionality:
    Open/Close DataPipe
    Start/Stop network (also referred to as "RF quiet")
  The WDC Build Environment is substantially the same as the WSN build environment.

Hardware Updates

The WDC and WSN may both leverage a BootLoader architecture, enabling over the air firmware update.

The WDC and WSN may both use the Atmel 802.15.4 radio, with less power usage and more robust RF capabilities.

A MSD (multi-sensor device) may combines multiple sensors onto one sensor daughter board. Board uses standard I2C interface to WSN.

Remote Data Controller (RDC)

Figure 5:
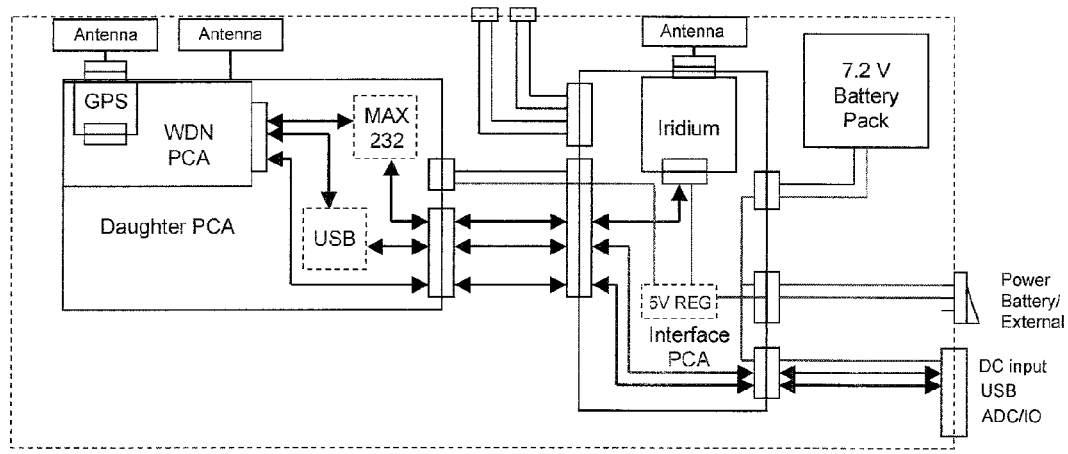
FIG. 5 is a diagram showing a block diagram of a remote data controller (RDC), similar to the WDC, for the exemplary network described hereinabove.

FIG. 5 illustrates a remote data controller (RDC). The RDC is a remote data controller that allows a network to be controlled by an xTango Server remotely using the Iridium network as the communications pipe.

RDC wakes up, starts the network, retrieves and subsequently sends all SAIL events, reacts to any inbound control messages and then goes back to sleep.

Generally, the RDC functions as an independent WDC. However, whereas the WDC needs to be connected to the xTango server to shift its information to and take instructions from the xTango server to operate the network, turn on, turn off, send messages, etc., the RDC does not need an xTango server. The RDC may be put in a remote location, and set up on a cycle, such as 20 minutes "on" and 40 minutes "off". When the RDC is "on", it will start a network, gather the information from the various sensors (in or connected to the WSNs), send it through the Iridium modem up to a back to a main system (not shown, comparable to the computer 102 shown in FIG. 1).

The RDC may combine the following into a single robust rugged package:
 WDC
  USB Daughter Board
  GPS Enabled
 Iridium Modem
 Antennas (GPS, Iridium & 802.15.4)
 Interface Board
  Provides interconnectivity and power regulation.
 Large Battery for extended deployments
 Firmware is WDC code with Iridium modem management drivers.
 Firmware has longer sleep cycles for better power management. Sleep cycles can be adjusted to suit the deployment needs.
  While the RDC is asleep, WSN nodes are in RF quiet yet still are receiving Sensor SAIL events and awaiting the RDC to start the network at which time the WSN will deliver all cached SAIL events and the RDC will forward those to the master xTango Server that is monitoring the Iridium messages.

Always Available Wireless Node (AAWN)

Figure 6:
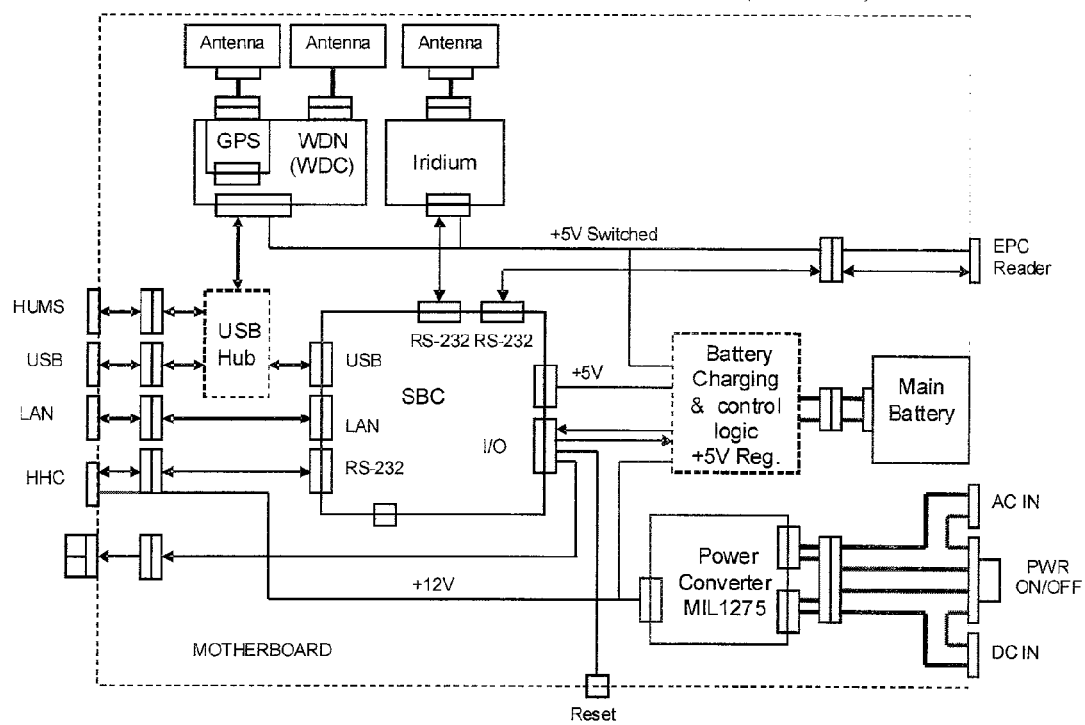
FIG. 6 is a diagram showing a block diagram of an always available wireless node (AAWN), for the exemplary network described hereinabove

FIG. 6 illustrates an Always Available Wireless Node (AAWN), which may be a complete network controller package that embeds:
 Low power Single Board Computer running Windows CE and hosting the xTango Server and the xTango Database
 WDC snapped into the AAWN mother board
 Iridium modem driven by the xTango Server
 GPS receiver, driven by the xTango Server
 Two Ethernet Connections
 Two RS232 interface (Gen2 Reader??)
 Up to two USB ports for external memory, printers or any other supported USB device.

The AAWN was designed for extreme rugged self contained AWAVE control and is intended to be deployed into harsh and very remote areas that need more than what an RDC can provide and still have no need for any infrastructure at all. The AAWN is different than an RDC due to the AAWN having a SBC running the xTango Server and hosting the xTango database where as the RDC requires a remote xTango Server and remote xTango database.

If you took the xTango server, and put it on a cellphone, processor, WindowsCE, has all the controls, database (not shown), much smaller, designed to be remote. The AAWN is basically a WindowsCE device, running xTango, and has a WDC connected to it so that it can bring up the mesh network.

The AAWN can substitute for the xTango server. It interacts with the WDC through the USB. It is intended for using in the field. It has GPS. Its database may be accessible through Iridium, rather than integrated in the AAWN.

The AAWN is an amalgamation of many different hardware systems and sophisticated software to control the hardware systems.

The WDC does not control the GPS, that is controlled by software running on the SBC and is under xTango Server control.

The WDC does not control the Iridium modem, that is also now controlled by the xTango Server.

There is little firmware in the AAWN, the WDC has it's regular production firmware, the SBC has a pre-defined and pre-configured Windows CE version and the AAWN mother board has no real Firmware at all.

The xTango Server that is delivered with the AAWN deployment takes on many more roles and responsibilities.
 Power Management to all electronic components that make up the AAWN.
  WDC, GPS, Iridium, USB Hub, Ethernet Ports
  Aggressive power management of the Single Board Computer
  React to the AAWN buttons
   Software Reset
   Emergency Shutdown (RF quiet)
   Hardware Reset
 All other normal xTango Server responsibilities xTango Server xTango Server is a application server that handles command and control of one or more Tango Networks.

The xTango Server may be built using Microsoft DotNet technologies; written completely in C#.

The xTango Server may be deployed on Windows Desktop, Windows Server and Windows CE platforms:
 Windows XP, Vista
 Windows Server 2003 or higher
 Windows CE v5.0

The xTango Server may support several programming models:
 Web Services (SOAP-RPC)
 C# Call Level Interface (C# CLI)
 Tango XML Protocol The xTango Server may support several SAIL event delivery protocols:
 HTTP Post to a defined Web Service interface
 Email
 FTP
 JMS Message Bus The xTango Server configuration may be defined in a portable XML configuration file.

The xTango Server may support user-defined MetaData allowing user-defined and keyed data structure be stored on the WSN. Tools may be provided to allow MetaData configuration and subsequent deployment The xTango Server may leverages Microsoft SQL Server 2005, SQL Server 2005 Express and SQL Server 2005 Mobile. System integrators may reuse the SQL Server for their application specific tables.

The xTango Server CLI and Web Services allow user defined queries be executed against the internal SQL Server database.

The xTango Server provides robust logging and tracing using the Open Source Log4Net components. Logging Appenders can be dynamically added without recompiling the Server.

xTango Database Architecture

The xTango Database (see FIG. 1) may be arranged, as follows:

- WDN Buckets—Part of metadata—memory record on WDN/WSN (NN)
- XTango MetaData—Database flattening scheme for storing data on a NN
- XTango MetaData Type—Each metadata type has a definition for the tables and records that will be stored on the individual NN. The metadata type is the way that the data is "encoded" or re-formatted onto the NN and the way the data is re-constituted back into the database.
- Settings Messages—Messages that are used to set thresholds, parameters, etc onto the NN. For example—a message to set the lower temperature reporting threshold on the NN.
- WDN Settings—The values that are set by the threshold messages. See above
- Sensor Config—Initial values and thresholds that are set into a sensor.
- WDC—Wireless Data Controller—one per mesh. Initial device that starts the sync messages.
- WDN—Wireless data node—the nodes that comprise the network.
- Events—Specific actions that happen anywhere in the system. For example—a door open is detected by a NN. Or a devices is reported missing by the main server
- event_subscriptors—Other systems are allowed to subscribe to events so they will get notification when one of these events have happened. For example—a system can subscribe to be notified whenever a NN goes over a temperature sensor threshold.
- Event Types—Each event has a type—"t" for temp, "h" for humidity, "door" for a door open, etc. Types are sensor defined.
- SAIL—Sensor rAIL—I2C bus sensor protocol for attaching sensors to a NN.
- Users—Users that can log into the xTangoServer system to control the network—show events—add or delete network nodes, subscribe to events, etc.
- WDN_Messages—Messages that are sent from a NN to either other NN's or to the NC (WDC)
- Containers—Holds 0-n items that are tracked by NN's.

The database may be kept simple to ensure portability between SQL 2005 and SQL 2005 Mobile. There are no database managed foreign keys. The database allows for an integrator to build a system using developer machines and use tools to migrate database to mobile platform. Integrators are encouraged to use the database for their application specific data. If metadata features are to be deployed then the integrator should use the database. The xTango Server uses the Microsoft Distributed Transaction Server to facilitate transaction management within the application.

Integration APIs

Several Connectivity Mechanisms

- Web Service SOAP-RPC interface WSDL published on xTango.org web site. Use DotNet tools, Java Tools or any other Web Service enabled technology
- C# Call Level Interface exposing all of the same capabilities that the Web Service SOAP RPC does.
- Simple Socket Interface allowing more sophisticated users the ability to generate the Tango XML control documents and submit them to the xTango Server for processing. Under the covers the above mentioned Web Services and C# CLI are submitting the very same documents to the xTango Server.

The Tango command documents may be simple XML messages that the xTango Server receives and subsequently produces simple XML response documents.

There is no XML Schema associated with the command documents because in many cases the command document is simply forwarded to the WDC or WSN for processing and the XMLLite parser does not support schemas or namespaces.

xTango Server DataPipe Architecture

In many deployments the system is required to store manifest data on the WSN. To store such data the xTango Server must leverage a peer to peer logical data pipe to increase the network throughput.

- DataPipe supports encrypted pipe data
  - TripleDES using Symmetric pass phrase, uses kernel.dll and advapi32.dll services.
  - Tango message is not encrypted but the manifest data; the sensitive component of the data is encrypted using a FIPS 140.2 compliant algorithm and FIPS 140.2 certified operating system services.
- DataPipe will apply compression as needed. If manifest data is greater than 512 bytes then Compression is utilized.
- DataPipe will be used also for Over the Air firmware upgrade via BootLoader.
- WSN flat database is a sparse matrix bucket system randomly using the Flash memory to ensure longevity of the Flash electronics.

xTango Sail Event Distribution

SAIL Event Distribution loosely follows the Observer Model.

System allows for multiple subscriptions for a prescribed SAIL event.

System allows for a periodic retry in the event a SAIL message is undeliverable to its subscribed end point. The retry interval and the retry count are user configurable. If after the retry has been exhausted the event is set to a undelivered status.

HTTP Delivery: Delivers the SAIL event to a web service endpoint that adheres to a specified WSDL interface.

- Note: The system integrator's web service end point MUST implement the web service exactly as it is defined in the WSDL including the namespace.

EMAIL Delivery: Delivers the SAIL event to an email address

- Note: Only one email address is supported per subscription. If the event needs to be delivered to more than one email address, make a distribution list aka all@phaseivengr.com or create multiple EMAIL subscriptions FTP Delivery: Delivers the SAIL event to a directory on a FTP site.

ActiveMQ-JMS Delivery: Inserts the SAIL event into a JMS message bus

Limitations:

- Currently there is no mechanism to re-route a delivery to an alternate service endpoint.
- Currently there is no mechanism to receive and or process a confirmation of receipt. If xTango can deliver the SAIL message to the Service end point xTango is done processing that message.

xTango Logging/Debugging

Logging is accomplished using the Log4Net Open Source component. There is a configuration that defines a Console logger and a rolling flat file logger. Other loggers can be configured with no application impacts.

http://logging.apache.org/log4net/ for configuration details xTango Fault Tolerance The xTango Server has many layers of exception handling.
    WDC Communications: If the xTango Server can not communicate with the WDC it throws an exception, catches it in a different layer of the application and simply turns off the WDC components. The rest of the application server is running which enables database connectivity, SAIL event distribution retry logic still functions.
    Database Connectivity: If the xTango Server looses connectivity to the xTango database the application considers this a severe fault and shuts down the xTango Server.

xTango Build Environment xTango Server:
    Visual Studio 2005; written completely in C# and portable to any Windows Platform including Windows CE
    Uses FTDI USB driver for connectivity to WDC (transparent to user)
    Uses Xceed compression component for DataPipe compression
    Uses Kernel Level services for encryption xTango Run Time
    xTango Server requires the following:
    Microsoft DotNet v2.0 Framework
    SQL Server 2005 Express or greater WEBS Web Server:
    C Runtime Library xTango Web Application:
    ASP.Net v2.0
    IIS Deployment Model(s)

Figure 7:
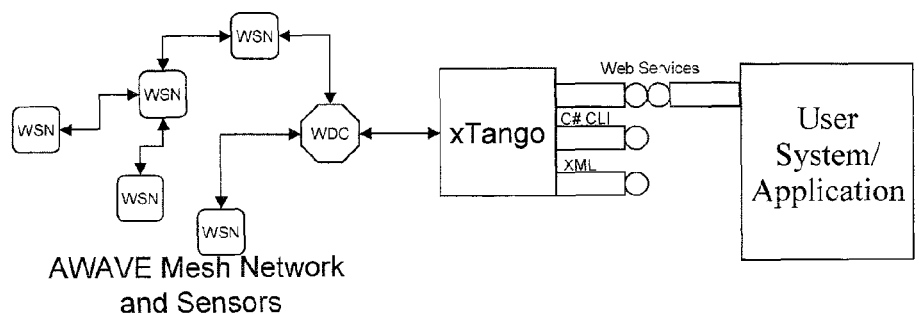
FIG. 7 is a diagram showing a sample deployment, for the exemplary network described hereinabove.

FIG. 7 illustrates a sample deployment. A User Application/System (Demo Web Application Mesh Control System) uses the xTango Web Services SOAP-RPC API to
    Start/Stop Network (Put network in RF quiet, Discover or Normal Operational Mode)
    Query data from the database using dynamic SQL
    Query manifest data from WSN Tag
    Update Manifest Data in database and WSN The xTango Web Application uses the C# CLI which provides the same API that the web services do.

The User Application/System connects up, operates the network, starts stop, collects information.

Figure 8:
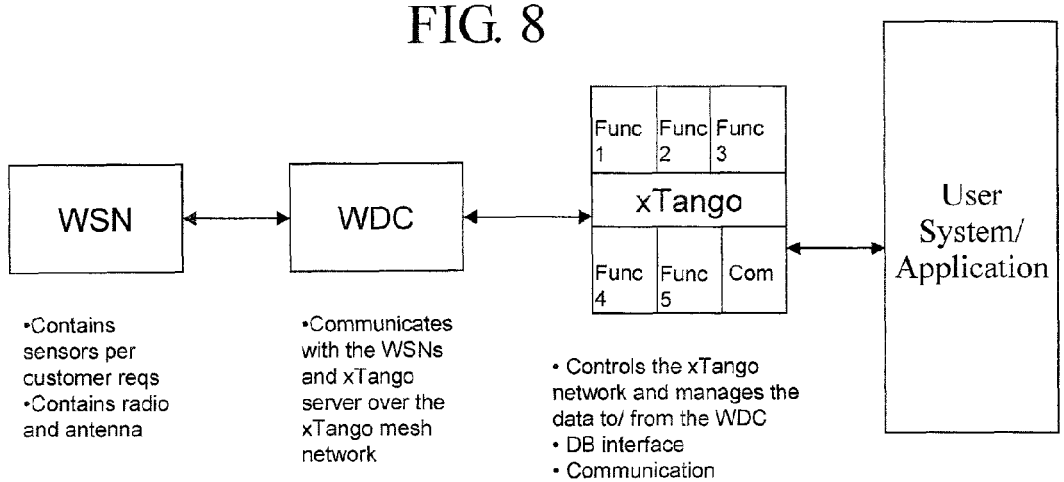
FIG. 8 is a diagram showing a potential deployment, for the exemplary network described hereinabove.

FIG. 8 illustrates another potential deployment.

| | |
|---|---|
| WSN: | Contains sensors per customer requirements |
| | Contains radio and antenna |
| WDC: | Communicates with the WSNs and xTango server over the xTango mesh network |
| XTango: | Controls the xTango network and manages the data to/from the WDC |
| | DB interface |
| | Communication |

Addressing Scheme

A device addressing scheme is disclosed herein. Generally, the scheme is based on a bitmask. In the TABLE below, device number (1-10, etc.) is on the top row, and the device ID to be used in the network is on the bottom row.

The numbers which are better are those that do not have multiple bits in the bitmask. For example, a binary "3", represented as "0011" has two bits (ones), instead of having one bit. For example, the $7^{th}$ address (top row) in the addressing scheme is 12 (00000012). For the $10^{th}$ device, the address is 00000020.

| 1 | 2 | 3 | 4 | 5 | 6 | 7 | 8 | 9 | 10 | ... | 78,125 |
|---|---|---|---|---|---|---|---|---|---|---|---|
| 1 | 2 | 4 | 8 | 10 | 11 | 12 | 14 | 18 | 20 | ... | 8888888 |

This addressing method allows for a simple "and" of an address to see if the device needs to route the message. This addressing scheme means that no device needs to keep a routing table, just a network mask allowing for an easier resetup of the mesh in case of movement of devices or movement of interferers.

Figure 9:
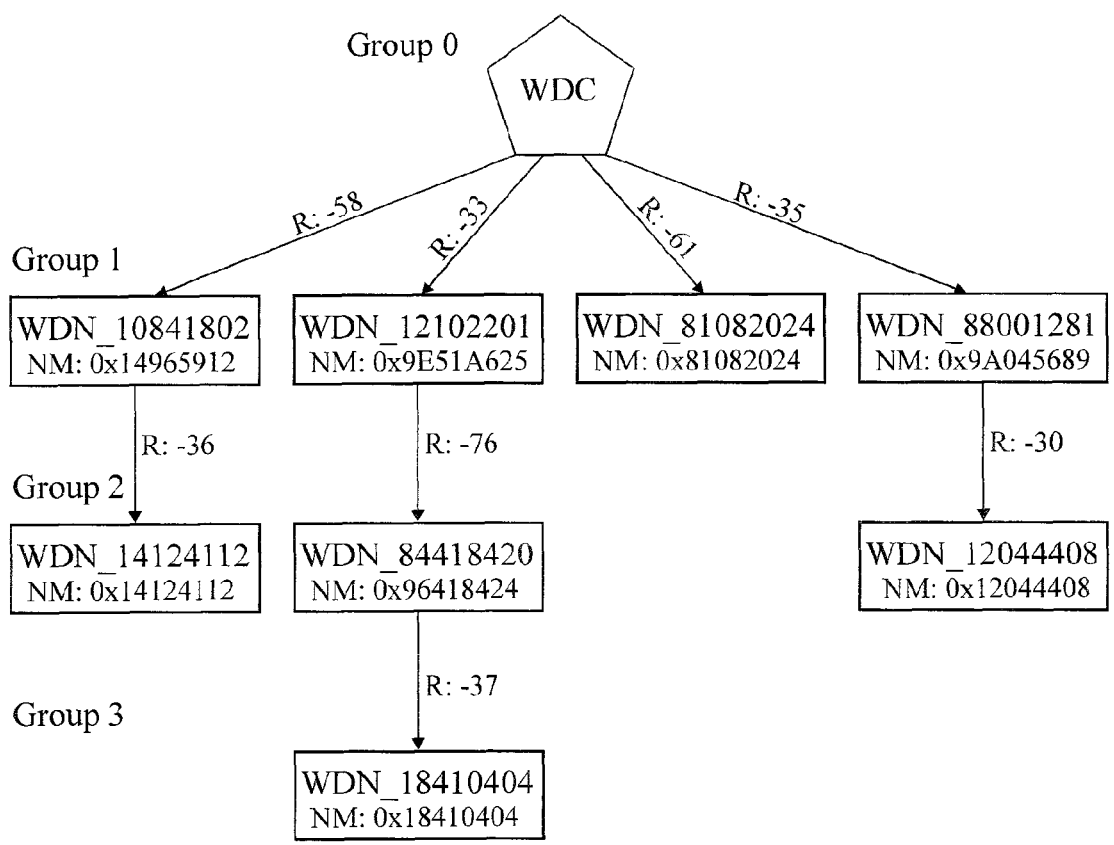
FIG. 9 is a diagram showing an addressing scheme, for the exemplary network described hereinabove.

FIG. 9 illustrates a running network, showing a WDC (NC) and several WDNs (NNs), and will be referred to during the following discussion. Each WDN is a running network node. The WDC is the network controller.

The WDN is designated Group 0 (Gr0).

In Group 1 (Gr1), four WDNs are shown, and have the following IDs.
    WDN__10841802
    WDN__12102201
    WDN__81082024
    WDN__88001281

WDN IDs may be referred to by their last three digits, such as '802, '201, '024, '281.

In Group 2 (Gr2), three WDNs are shown, and have the following IDs.
    WDN__14124112
    WDN__84418420
    WDN__12044408

In Group 3 (Gr3), one WDN is shown, and has the following ID.
    WDN__18410404

The signal paths between the devices (WDNs and WDC) are illustrated. The "R:" values are the relative communication signal strength between the devices which may be used to determine if a device (NN) is having trouble staying on the network, or that a device is going bad (e.g., damaged).

When a network node sends information upstream (back towards the WDC) each node looks at the child that sent the data and updates their network map accordingly.

As an example, node 18410404 sends a temperature event back upstream to the main system.

Each node in the upstream path updates their network mask (NM) with the node's id's.

When a node has no children, the network map is its address.

For example, for the node '404 in Gr3, the network mask (NM) is: 0x18410404 (this node has no children)

As messages travel from 18410404 to 84418420 the network masks of the two devices are combined in a bitwise-OR.

For example, for the node '420 in Gr2, the network mask (NM) is: 0x96418424 (the bitwise-OR of 0x18410404 & 0x84418420)

As messages travel through 12102201, it bitwise-or combines its address with 84418420 and 18410404 to create its network mask.

For example, for the node '201 in Gr1, the network mask (NM) is: 0x9E51A625 (the bitwise-OR of 0x18410404 & 0x84418420 & 12102201)

The network mask for each node reflects the children under that node.

For example, send a message from the WDC to WDN_18410404 ('404 node). When the message is sent from the WDC, all of the devices on the first level (Gr1) catch the message because they recognize the WDC as their parent.

Each of the first level (Gr1) devices performs a bitwise-AND of the message against its network mask, comparing to the destination address and, if equal, continues to route the message.

For example, for the message being sent from the WDC to WDN_18410404,

At the '802 node (Gr1), 0x18410404 & 0x14965912==0x18410404 (FALSE)
At the '201 node (Gr1), 0x18410404 & 0x9e51a625==0x18410404 (TRUE)

This is the only network mask that works. All other devices drop the message and 0x12102201 sends it on to it's children. The message moves through device 0x84418420 in the same manner and gets to device 0x18410404.

At the '024 node (Gr1), 0x18410404 & 0x81082024==0x18410404 (FALSE)
At the '689 node (Gr1), 0x18410404 & 0x9a045689==0x18410404 (FALSE)

Network masks are cleared periodically and are rebuilt as child devices report back in.

As mentioned above, ZigBee is set of high level communication protocols, based upon the specification produced by the IEEE 802.15.4 taskgroup. The present invention can be viewed as an alternative to ZigBee, and may be contrasted therewith as follows.

In ZigBee, generally, devices do not move around. (Or, if they do move, they are still well within range, so the movement is immaterial.) Therefore, ZigBee conveniently uses routing tables (discussed above). The present invention is adapted to a dynamic environment, where the items are moving, in and out of range (of a node), and signals can also be blocked. A protocol such as ZigBee uses a lot of power and energy to re-figure out the route. The present invention avoids routing tables, and can re-locate nodes without using a lot of power and energy. Also, a protocol such as ZigBee does not offer a RF-quiet mode. The present invention offers low power, dynamic routing, and the ability to go RF-quiet on a moments notice.

The network disclosed herein is constantly (every data frame; every sync period) being set up. If a device goes out of connection (moved—something put in front of it) it picks up the next sync and gets back on the network. The server keeps track of the mesh in its database. If a particular WSN can't be found, after a period of time, the server may report it missing.

A similar situation may occur if a WSN loses power. Functionality can be incorporated for the WSN to keep track of its battery state, and send a "battery low" message up to the WDC.

The server maintains a database of the devices that should be on the network. Each WSN reports back its network mask. If one is not in the mesh, and cannot be found by the server, it will be reported missing, because it did not report that it is on the mesh.

Mesh Network Timing

As described in greater detail hereinbelow, a given communication frame comprises at least one sync period, at least one data period, and a third (data) period which may be referred to as "tbd" for future use.

The sync message generally comprises the ID of the network (so that a device can decide whether it want so join a given network in a situation where there are multiple networks available to the device) and one or more of the following parameters:

the identity of a parent (who is sending out the sync message)
the frame information (information about the various periods comprising the frame)
a parameter indicating which group the device is in that sent the sync message.
a data flag indicating whether a pipe (or a data) period is needed.
a time parameter telling the devices when to report back their position in the network.

As a sync message is captured by a device, it may alter pieces that need to be altered, before sending it on. For example, a device would alter information about the group and the parent. A device would not alter any of the frame information, because all devices have to work off of the same frame information.

The way the sync message is propagated throughout the network, and the addressing scheme (discussed above), are fundamental to how the network works.

Mesh Network Modes

Generally, there are four different mesh network modes:
1. a Sleep/RF Quiet mode. This is when the WDC has been put into a mode (by a user, such as through a client interface), that says don't send out any syncs (no RF)
2. a Network Running mode, with No Data Traffic. This can be fast or slow sync, depending on whether the devices that should have reported in have reported in.
3. a Network Running mode, with Sensor/Data Traffic. This can also be fast or slow sync, depending on whether the devices that should have reported in have reported in.
4. a Network Running, with Pipeline Data Traffic.

For the network running modes:

Fast sync is used for finding devices. This uses more power (than slow sync), and sends out more syncs to find devices and get them on the network. Once all the devices are found (the server knows this, from its database), the system reverts to slow sync.

Slow sync is used, once all devices are found, and is the "normal" operating mode of the network. In this mode, the nodes may send data indicative of sensor events, etc. This is the lowest power mode. (The batteries may last longer if you simply let things run, than if you put the system to sleep.)

xTango State Transition Diagrams

Figure 10A:
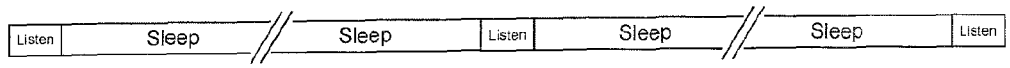
FIGS. 10A, 10B, 10C are diagrams showing transition states for sleep (RF quiet), fast sync and slow sync modes of network operation, for the exemplary network described hereinabove, according to an embodiment of the invention.
Figure 10B:
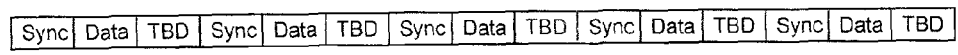
Figure 10C:
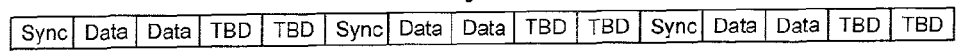

FIG. 10A shows state transitions for the Sleep/RF Quiet mode. As shown herein, a network node awakens periodically and listens for a network. This is low power state when no network controller is present, or if the network is in RF-Quiet Mode. The xTango server places the network node in the Sleep/Quiet mode. Once in Sleep/Quiet mode, the network nodes listen periodically, such as every 5 minutes for 5 seconds, for a synchronization message from the mesh network.

For example, a node (WSN, WDN) will wake up, listen for a while, see if it sees any sync messages, and (if not) go back to sleep. The node wakes for usually 5 seconds (1 or 2 sync periods), then goes back to sleep for anywhere from 15 second and 5 minutes. As time goes by, and no sync messages are detected, the node may back off (such as in 15 second increments) until it is sleeping most of the time. This may be adjusted dynamically by the WDC. Or, the WSN (WDN) is smart enough (as programmed in firmware) to know to go to sleep for longer periods. The main goal of dynamically adjusted sleep periods is extending battery life. The tradeoff is (of course) that the node may be asleep when the next sync signal is sent by the WDC.

FIG. 10A shows state transitions for the Fast Sync mode. Here, the network node (WDN, WSN) can synchronize to the network. This is a transition state. Fast Sync Mode is used to find nodes on the network. More syncs (and less data) per communication frame means that there are more chances for a network node to catch a sync.

Once a synchronization message has been received, the network node transitions to a normal running mode (either fast or slow sync, depending on the network).

In the overall communication frame shown here, there are three sequenced elements: "Sync", "Data", and "TBD (optional)". A Fast Sync frame may consists of a single Sync period, followed by a single Data period, followed by a single "TBD" period. Each period may be, for example, 1 second. Sub-periods, for sync and data, which may be 1/64 second, are discussed below.

In fast sync, the WDC trying to find all of its children. The xTango server has a database of all of the children, and it is trying to find them. Generally, since there is no reliance on routing tables, the network needs to be built over and over. However, with the addressing scheme disclosed herein, this can be a very efficient process.

FIG. 10A shows state transitions for the Slow Sync mode. In this mode, the network node (WDN, WSN) is synchronized to the network and is ready to transmit data. This is the "normal" live network state that the network will be operating in, once all the nodes have reported in. Here it can be seen that there are more data periods for a given sync period than in Fast Sync mode. The ratio of data periods to synchronization periods is settable via the software The xTango server transitions the network node from a Fast Sync mode to a Slow Sync mode after all nodes in the xTango database have reported in. The xTango server will transition back to Fast Sync mode if any nodes go missing or are in danger of going missing. This transition is so the nodes might be picked back up. A node is considered to be in danger of going missing if it misses one sync (has gone over its time to report back). For example, this could be because it has been temporarily blocked in such a way that it can't see any other devices (NNs). If the situation persists (node failing to report), it may be damaged or has lost power, etc.

For example, once in Slow Sync mode, the network node initiated frames consist of one Sync period followed by two data periods and two TBD periods. Each period may be, for example, 1 second. Sub-periods, for sync and data, which may be 1/64 second, are discussed below.

Information about the structure of the communication frame, such as the number and duration of the various sync, data and TBD periods, is embedded in the sync message. All the blocks are adjustable, and this information is contained in the sync message so that all of the devices (WSN, WDN; also WDC) know what is happening. The communication frame can be reconfigured every time it is sent out.

The "TBD" periods may be used (in the future) for location, multi-layer meshing, etc., and may be omitted, leaving only sync and data periods.

Generally, the network is not targeted at continuous communication, such as voice communications. Rather, it is targeted to things like sensor data, inventory, relatively non-dynamic data. However, it could be adapted to perform such a function. For continuous, what you would have to do is send out sync to build the network, and then have a large number (such as 20) of data periods. This is mentioned as an illustration of how a "ratio" of sync and data periods can be adjusted for particular applications. Since that information is sent out on the sync message, this ratio can be changed "on the fly".

In Slow Sync mode, every device (node, WDN, WSN) may report in based on a configurable setting, such as reporting its position, every 5 minutes. This would include a given device's ID (who I am), and which other device is functioning as parent to the given device. Because of the addressing scheme used herein, this is not critical to maintaining the network. Rather, it is simply a way of performing a quick health check on the current configuration of the network.

The server knows what devices it should have. Every device reports in, based on a configurable setting. Example, WSN reports its position in the network every 5 minutes. This is who I am, this is who my parent is. It is not necessary to report all the time.

The devices can be moved around constantly, and the network will stay up. You get a picture (instantaneous snapshot) of where things are, every 5 minutes. Any mapping is superfluous. Other networks use those maps for the routing table. Here, the routing table is built into the network address itself. Not really a routing table.

Mesh Network Modes
Sleep/RF Quiet
  Listen
    One 5 second listen period for every sleep period
      If a synchronization burst is received during this period and the network is in Discover mode or the node recognizes the network id then node will transition to normal running mode (Fast or Slow Sync).
  Sleep
    Initial sleep period starts at 15 seconds (e.g.). The sleep period may increases by 15 seconds (e.g.), every cycle, until a 5 minute (e.g.) maximum is reached.
Normal Network—No Data Traffic
  Synchronization
    3 to 4 Tx/Rx sub periods (1/64th sec) every 5 seconds
  Data
    None
Normal Network—Sensor/Normal Data Traffic
  Synchronization
    3 to 4 Tx/Rx sub periods (period=1/64th sec) every 5 seconds
  Sensor/Data
    Average occurrence of 40 sensor/data events per day
    Each event requires 6 sub periods of Tx/Rx for data and acknowledge
    Sub periods are divided up between (odd group listen, even group send) and (odd group send, even group listen). That way node data can flow through the network.
Normal Network—Pipeline Data Traffic
  Synchronization
    3 to 4 Tx/Rx sub periods (1/64th sec) every 5 seconds
  Data
    Average occurrence of thirty 1-2 second data pipes per day, for a normal tracking application such as sensor data (temperature, humidity). In other "real time" applications, there may be many more data pipes per day.

The pipeline is operative in both directions, upstream and downstream. For example, upstream if a WSN has a bunch of data to send to the WDC. In a pipe, the two devices come up initially in the pipe, and the WDC sends down a pipe open message, which says it is opening a pipe for the WSN. Then, the WSN starts sending its data. It says, here is a record, waits for an immediate ack from the WDC, and this process repeats itself every communications frame. If it ever stops, the WSN waits a certain time (timeout), closes itself down, then resync, open another pipe and send more. The goal is to pump a lot of data, upstream. There are, however, downstream situations, where it may be necessary (for example) to write EEPROM data, such as for program code, down to the to the tag (network node device, WSN, WDN), and that works the same way.

In a pipeline situation, there may be another device (WSN-2) in middle, between the WDC and the WSN (ends of the pipe). The device WSN-2 is listening, in the chain when the pipe is open. It sees a message going downstream, and immediately re-broadcasts it (WSN-2 is a "hop"). Data flows through WSN-2, in both directions, during the pipeline. A pipeline may occupy the entire data period(s), such as up to 2 seconds per communication frame.

Fast Sync

Figure 11:
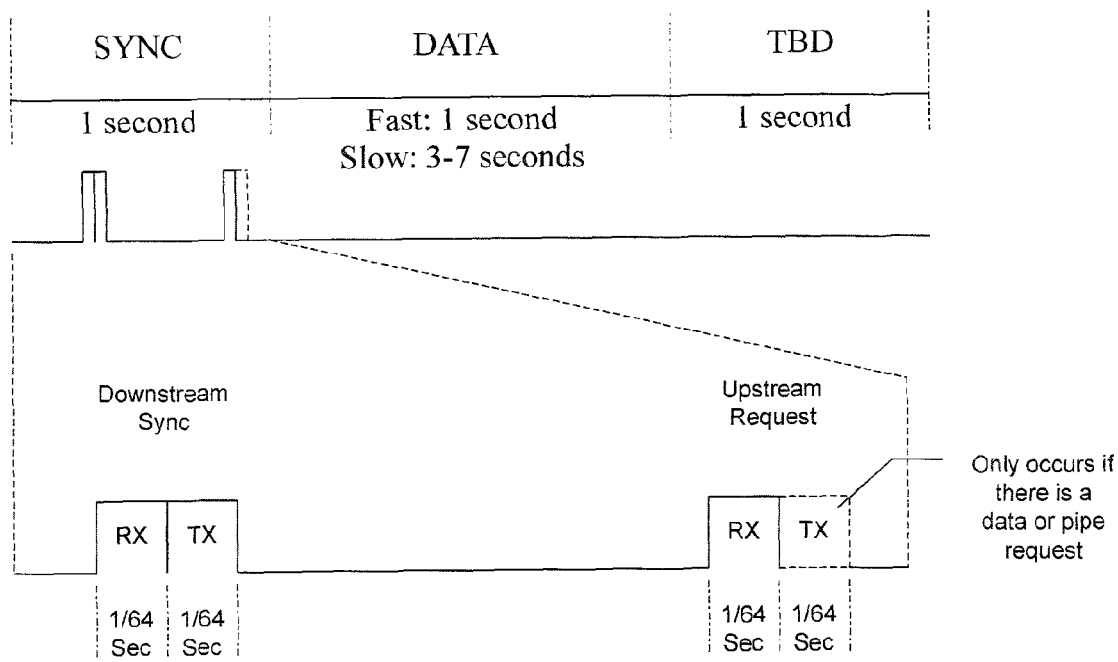
FIG. 11 is a diagram showing transition states for fast sync and slow sync (combined in one diagram), for the exemplary network described hereinabove, according to an embodiment of the invention.

FIG. 11 illustrates fast sync (and also slow sync).

In Fast Sync, each of the Sync, Data and TBD periods may be 1 second (for example). TBD may be Location/Data.

Downstream Sync—

Upstream Request—The Tx (dashed lines) only occurs if there is a data or pipe request.

Rx—receive a sync

Tx—send a sync

This shows that every device needs to catch a sync (Rx) from a parent (or WDC, in the case of a Gr1 WDN), and throw a sync (Tx) to children.

In the Downstream Sync, you see Rx and Tx.

Each of Rx and Tx is one Sub-Period (SP), Tx immediately after Rx, in a "wave-like" manner.

A device only has to be up for its Rx and Tx sub-periods.

In the Upstream Request

Every device (WDN) has to listen for its children, are its children sending it anything (I need data, I need a pipe, here is who I am). Every device does a quick listen. If none of the above (no data, no pipe request), it does not need to do a transmit part of that (dashed lines). Otherwise, it will.

That is how the sync periods work. The information goes out, sets up the network, comes back from the children to know if it needs to open up a data period.

1 sync, 1 data, 1 location data (referred to as "TBD" in other figures).

FIG. 11 also shows slow sync. Here, the data period is made longer, such as from 1 second (fast sync) to 3-7 seconds (slow sync). (The longer period may be, for example, 3-7 one-second data periods, rather than one long period.) Consequently, the ratio of data to sync is increased. The data period can dynamically be set, by the server. All nodes are notified of how the communication frame will appear in the sync message sent by the WDC (NC).

The devices in the network are synched in a manner that the radio does not have to be up very often. The radio represents a major drain of power on the devices. The data period can extend to whatever is desired.

When Group0 sends out its sync message (SP2), it is the Gr1 devices that see it (RSSI within threshold, a decent connection), then you can become part of that group. Then Gr1 sends to Gr2. A Gr1 gets blocked, it hooks up to a Gr3, and its children (which were Gr2 and Gr3) now become Gr4 and Gr5.

Synchronization Sub-Periods (SPs)

Reference is made to the TABLEs (Downstream Synchronization, Upstream Request) presented below.

The sync period (above) may be divided into sixty-four (n=64) sub-periods (SP). Generally, the number of sync periods is related to the number of groups (and vice versa). So, for 30 groups (G=30), there are approximately 60 (2×G) sync periods.

As will be seen, having 64 sub-periods with 30 groups conveniently allows for an unused sub-period at the beginning and end of each of the Downstream Synchronization and Upstream Request portions (each comprising 32 SPs) of the sync period.

The sync period can be anything. Conveniently, it is based on the RTC (real time clock).

Can be anything, the RTC gives 1/64 granularity. For SP.

There are 64 sub-periods in a sync period. Go down 30, turn around, come up 30. With a little work happening at the beginning and at the end, for processing the data.

Example

In sync sub-period 2, the WDC (Group 0) sends its sync message, which indicates that it is a Group 0 (Gr0) "parent". Any Group 1 (Gr1) device reacting to this sync signal changes (modifies) the "parent ID" in the message, based on which group they are (Gr1), and sends it out again. Any device catching that message knows that they are Gr2. The Gr2 devices modify the "parent ID" in the sync signal, and send it on, in the next sync sub-period. In this "wavelike" manner, the mesh propagates, until the hierarchically (and possibly physically) farthest devices (in this example, Gr30) receive the sync signal. Then, after waiting two SPs, for things to settle down, the farthest out (Gr30) devices start sending their upstream requests, followed by data (in the data period of the communication frame) which propagate (hop) SP-by-SP (and Group-by-Group), back up to the WDC (Gr0).

In the downstream portion of the sync period, the only things changed in the sync message are the group of the receiving device and the parent node that sent the sync.

Data flows either from the NN upstream to the WDC or from the WDC downstream to the NN. Generally, the only data that flows just between NN's are acknowledgements, although the system could be set up to effect data transfer between nodes (NN-to-NN).

Generally, the ability of a device to join and participate the network is not dependent on signal strength (as long as above a threshold). Because of the CSMA/CA modulation scheme, a device sees if anyone else is broadcasting. If, for example, there are 100 devices trying to get up, some will never be able to send out sync, they will go off, and find another parent. This is how things tend to level themselves out, automatically.

There may be a plurality G of 30 groups. The WDC is designated as Group "0". First generation children of the WDC, are designated "Group 1" WDNs. WDN children of Group 1 WDNs are designated "Group 2" WDNs, and so forth, up to "Group 30".

A first portion (such as half, or n/2=32; designated sub-periods SP1-SP32) of the sub-periods may be allocated to downstream synchronization.

A second portion (such n−n/2=32; designated sub-periods SP33-SP64) of the 32 sub-periods may be allocated to upstream requests.

The first (downstream) and second (upstream) portions should be equal to one another (same number of SPs), as they are both related to the number of groups, and each must accommodate all of the groups. Additional SPs may be inserted at the beginning and end of each of the downstream and upstream portions, to for turnaround (work that a device has to do internally).

For the Downstream Synchronization, as shown in the table below,
during sub-period SP2, the WDN (Group 0) sends a sync message which is listened to by Group 1 WDNs (the first group of WDNs, closest to the WDC);

during sub-period SP3 (the next sub-period, or SP2+1), the Group 1 WDNs send their sync messages, which are listened to by Group 2 WDNs (children of Group 1 WDNs);

... and so forth, as shown in the Table, up to during sub-period SP31, the Group 29 WDNs send their sync messages, which are listened to by Group 30 WDNs (children of Group 29 WDNs).

If, in a given sub-period, if more than one NN (WDN, WSN) belonging to a given group is trying to send (or receive), this is sorted out ("collisions" are avoided) by the CSMA/CA (Carrier Sense Multiple Access With Collision Avoidance) protocol which may be used.

| Downstream Synchronization | | |
|---|---|---|
| Sub-Period (1/64 second) | Sending Group | Listening Group |
| 1 | -n/a- | -n/a- |
| 2 | 0 | 1 |
| 3 | 1 | 2 |
| 4 | 2 | 3 |
| 5 | 3 | 4 |
| 6 | 4 | 5 |
| 7 | 5 | 6 |
| 8 | 6 | 7 |
| 9 | 7 | 8 |
| 10 | 8 | 9 |
| 11 | 9 | 10 |
| 12 | 10 | 11 |
| 13 | 11 | 12 |
| 14 | 12 | 13 |
| 15 | 13 | 14 |
| 16 | 14 | 15 |
| 17 | 15 | 16 |
| 18 | 16 | 17 |
| 19 | 17 | 18 |
| 20 | 18 | 19 |
| 21 | 19 | 20 |
| 22 | 20 | 21 |
| 23 | 21 | 22 |
| 24 | 22 | 23 |
| 25 | 23 | 24 |
| 26 | 24 | 25 |
| 27 | 25 | 26 |
| 28 | 26 | 27 |
| 29 | 27 | 28 |
| 30 | 28 | 29 |
| 31 | 29 | 30 |
| 32 | -n/a- | -n/a- |

As can be seen from the table above (and the table below), the sync period is divided into a downstream portion, arranged sequentially from the closest group (GR1) to the farthest group (GRn), followed by an upstream portion arranged sequentially from the farthest group (GRn) to the nearest group (GR1).

Generally, the way the sync message propagates from NC to the NNs in the farthest group is as follows: 8.

(a) the sync message sent by the NC specifies that it is a parent in Group 0;

(b) when the sync message is received by a NN in the first group (Gr1), which is a child of the NC, the NN modifies the sync message to indicate that it is parent in the first group for children in the next group (Gr2=Gr1+1), and resends the modified sync message to the children in the next group;

(c) when the modified sync message is received by a NN in the next group (Gr2), which is child to a parent in the previous group (Gr1, or Gr2-1), the NN in the next group (Gr2) modifies the sync message to indicate that it is parent in the following group (Gr3, or Gr2+1), and resends the modified sync message;

(d) repeating the step (c) until the sync message is modified and sent by a next to the last group (Grn-1); and (e) when the sync message is received by a NN in the last group (Grn), which is a last group, an upstream request portion of the sync period opens up for NNs to send requests to send data to the NC.

A given WSN (GR4) has an event (data to send). It needs to get the information up to the main system WDC. The sync establishes the network. When the sync comes to the given WSN, it knows who its parent is. Now, it needs to notify his parent that it needs to send some data, and the parent needs to notify their parent, and so on, up to the WDC. This creates a singular chain, up the stream, saying "here is a WSN who needs to send data". The whole time the message is coming upstream, it is also setting the network up.

The communication frame is arranged so that the data period follows the sync period. Generally, messages are specifically routed through the parent. Otherwise there could be a "message storm".

For the Upstream Requests, as shown in the table below, during sub-period SP33 the outermost group (Group 30, farthest from the WDC) of WDNs sends their upstream requests which are listened to by their parents (Group 29);

during sub-period SP34, the Group 29 WDNs send their upstream requests, which are listened to by Group 28 WDNs (children of Group 1 WDNs);

... and so forth, as shown in the Table, up to during sub-period SP62, the Group 1 WDNs send their upstream requests, which are listened to by the WDC (Group 0).

| Upstream Request | | |
|---|---|---|
| Sub-Period (1/64 second) | Sending Group | Listening Group |
| 33 | 30 | 29 |
| 34 | 29 | 28 |
| 35 | 28 | 27 |
| 36 | 27 | 26 |
| 37 | 26 | 25 |
| 38 | 25 | 24 |
| 39 | 24 | 23 |
| 40 | 23 | 22 |
| 41 | 22 | 21 |
| 42 | 21 | 20 |
| 43 | 20 | 19 |
| 44 | 19 | 18 |
| 45 | 18 | 17 |
| 46 | 17 | 16 |
| 47 | 16 | 15 |
| 48 | 15 | 14 |
| 49 | 14 | 13 |
| 50 | 13 | 12 |
| 51 | 12 | 11 |
| 52 | 11 | 10 |
| 53 | 10 | 9 |
| 54 | 9 | 8 |
| 55 | 8 | 7 |
| 56 | 7 | 6 |
| 57 | 6 | 5 |
| 58 | 5 | 4 |
| 59 | 4 | 3 |
| 60 | 3 | 2 |
| 61 | 2 | 1 |
| 62 | 1 | 0 |

-continued

Upstream Request

| Sub-Period (1/64 second) | Sending Group | Listening Group |
|---|---|---|
| 63 | -n/a- | -n/a- |
| 64 | -n/a- | -n/a- |

Figure 12A:
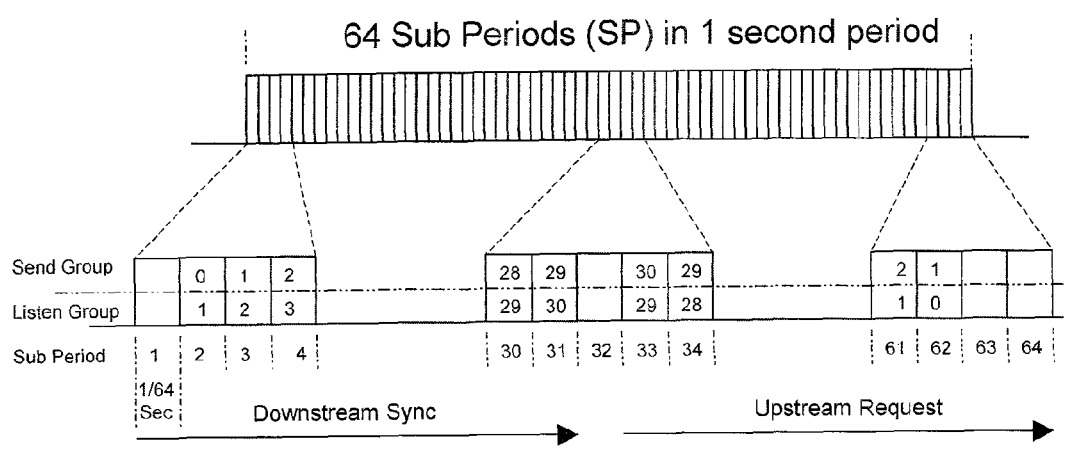
FIG. 12A is a diagram showing transition states.
Figure 12B:
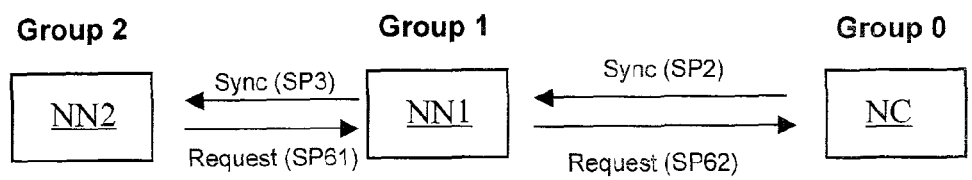
FIG. 12B is a diagram showing the flow of information, for a synchronization period, for the exemplary network described hereinabove, according to an embodiment of the invention.

FIGS. 12A and 12B graphically illustrate an example of the synchronization scheme described above.

FIG. 12A shows 64 sub-periods (SP) in one synchronization period. A synchronization period of 1 second duration may have 64 SPs of 1/64 second each.

FIG. 12B shows a Network Controller ("NC", which may be the WDC) sending a downstream sync message to a Network Node ("NN1"; which may be a WSN or WDN in Group 1) in SP2. NN1 receives the message, and passes it to its children ("NN2"; which may be a WSN or WDN in Group 2) in SP3.

The figure also shows NN2 sending a upstream request to NN1, in SP61. NN1 receives the upstream request and passed it to the NC in SP62.

Data Period

Generally, there are two different modes of data: normal and pipeline. The normal mode is used for general, random, network-wide data transfer.

In the normal mode, any node (WDN) can transfer data upstream of downstream, dependent on the modulation scheme (such as TDMA and CSMA).

In the normal mode, both TDMA and CSMA may be used to reduce communication collisions.

For example, using TDMA between even and odd sending and receiving nodes.

For example: using CSMA between the nodes of the even or odd groups during their associated communication sub-period.

The pipeline mode is used for single high speed data transfer between a start node and an end node (such as between the NC and an NN, or vice-versa).

The pipe may be requested by either WDC or WSN (either one can initiate it), but it is always built from the back (WSN), forward (to the WDC), which will always be the shortest distance.

In the pipeline mode, only those nodes involved in the pipeline are enabled for TX/RX, and all other nodes are put in RF quiet mode during the pipeline event.

Normal Data Mode

In a manner similar to that described with respect to the synchronization period, in the normal data mode there are a number (such as 64) of sub-periods (SPs) in each data period. For a data period of 1 second, each sub-period would be 1/64 second.

Data Tx and Rx is split between even (0, 2, 4, 6 . . . ) and odd (1, 3, 5, 7 . . . ) numbered network node groups. When even groups are in Tx, then odd groups are in Rx. The WDC is designated Group 0.

When data is being sent, all nodes are "on" in their respective even/odd periods even if they are not part of the data chain.

In addition there are "Work" sub-periods where the network nodes are processing the data in their buffers. No Tx occurs during these sub-periods for either even or odd groups A "work" sub-period is simply a period where the WDC or the WSN can move things through buffers, take a look at messages, determine whether it needs to reset a setting, etc.

Pipe

The pipe is built in an upstream manner. The device (NN) requests potential Tx, "I need a pipe" message. WDC says "OK, you need a pipe" on the next communication frame. Other networks will use routing table to create the link. The mesh network disclosed herein stays up for a certain, amount of time, and the pipe happens in the data period.

One might envision a "spread out" mesh, with the WDC sitting in the middle. Two devices, the two end devices, sitting on either side of the WDC, want to send data. Both sets of data are being sent, both trees of the mesh, without conflicting (through CSMA) until the last hop, because the mesh is spread out. The idea is that the two devices, on either side of the mesh, can be sending messages without conflicting with each other. Devices can move data throughout the entire mesh, without stepping on each other.

A limitation of the radio is that it can only be in either transmit (Tx) or listen (Rx) at a given time, it cannot be in both at once.

Description (Example)

DP1, start up the radios for the ODD Group devices to listen.

In DP2, . . . EVEN Group devices have the next two DPs (DP2 and DP3) to transmit data, ODD devices are listening.

For some reason, a listen radio needs to stay up longer (into the next DP) so that it catches the whole message.

The EVEN groups transmit to the ODD groups during those 4 SPs (really, only during 2 of the 4, plus the 1 previous and 1 after "buffer" listening periods), then you switch around, and the ODD groups to transmit to the EVEN groups.

If you have a device 3 that wants to send, it has to go through 2, through 1, to 0. When 3-odd is sending, 2-even is listening, and data follows from 3 to 2. Then, 2 goes into transmit, when the odds are listening. 2 has an ack that it wants to send back to 3, and data that it wants to send to 1. so during that period, it can send that message (same message? All in one?) to both its parent and its child.

In the next data period (four SPs), EVEN and ODD are swapped.

Data messaging. Every four periods, either a listen or a transmit. This is "normal", when a device has only a few messages to send.

If a device has a lot of messages to send, what you want to do is create a pipe. Only the necessary nodes become a pipe (pipe routers). Everyone else goes to sleep. A downstream pipe end (child) requests the pipe. The pipe is not a wave. Each device in the pipe starts in listen mode and stays there unless there is some data to send. Once the pipe is closed they go back to normal data flow operation.

In the potential Tx (dashed lines, FIG. 11) send a "I need a pipe message", goes up to WDC. WDC responds by sending out a message establishing the pipe. In other networks, a pipe is created with routing tables. Since routing tables are not used here, the pipe connection links can happen very rapidly. They stay up for a certain amount of time, then everyone goes back into sync mode.

| Normal Data Mode Sub-Periods | | | |
|---|---|---|---|
| Sub-Period (1/64 second) | Sending Group (TX) | Listening Group (RX) | Work Period |
| 1 | — | ODD | |
| 2 | EVEN | ODD | |
| 3 | EVEN | ODD | |
| 4 | — | ODD | EVEN |
| 5 | — | EVEN | |

Normal Data Mode Sub-Periods

| Sub-Period (1/64 second) | Sending Group (TX) | Listening Group (RX) | Work Period |
|---|---|---|---|
| 6 | ODD | EVEN | |
| 7 | ODD | EVEN | |
| 8 | — | EVEN | ODD |
| 9 | — | ODD | WDC |
| 10 | EVEN | ODD | |
| 11 | EVEN | ODD | |
| 12 | — | ODD | EVEN |
| 13 | — | EVEN | |
| 14 | ODD | EVEN | |
| 15 | ODD | EVEN | |
| 16 | — | EVEN | ODD |
| 17 | — | ODD | WDC |
| 18 | EVEN | ODD | |
| 19 | EVEN | ODD | |
| 20 | — | ODD | EVEN |
| 21 | — | EVEN | |
| 22 | ODD | EVEN | |
| 23 | ODD | EVEN | |
| 24 | — | EVEN | ODD |
| 25 | — | ODD | WDC |
| 26 | EVEN | ODD | |
| 27 | EVEN | ODD | |
| 28 | — | ODD | EVEN |
| 29 | — | EVEN | |
| 30 | ODD | EVEN | |
| 31 | ODD | EVEN | |
| 32 | — | EVEN | ODD |
| 33 | — | ODD | WDC |
| 34 | EVEN | ODD | |
| 35 | EVEN | ODD | |
| 36 | — | ODD | EVEN |
| 37 | — | EVEN | |
| 38 | ODD | EVEN | |
| 39 | ODD | EVEN | |
| 40 | — | EVEN | ODD |
| 41 | — | ODD | WDC |
| 42 | EVEN | ODD | |
| 43 | EVEN | ODD | |
| 44 | — | ODD | EVEN |
| 45 | — | EVEN | |
| 46 | ODD | EVEN | |
| 47 | ODD | EVEN | |
| 48 | — | EVEN | ODD |
| 49 | — | ODD | WDC |
| 50 | EVEN | ODD | |
| 51 | EVEN | ODD | |
| 52 | — | ODD | EVEN |
| 53 | — | EVEN | |
| 54 | ODD | EVEN | |
| 55 | ODD | EVEN | |
| 56 | — | EVEN | ODD |
| 57 | — | ODD | WDC |
| 58 | EVEN | ODD | |
| 59 | EVEN | ODD | |
| 60 | — | ODD | EVEN |
| 61 | — | EVEN | |
| 62 | ODD | EVEN | |
| 63 | ODD | EVEN | |
| 64 | — | EVEN | ODD |

Figure 13:
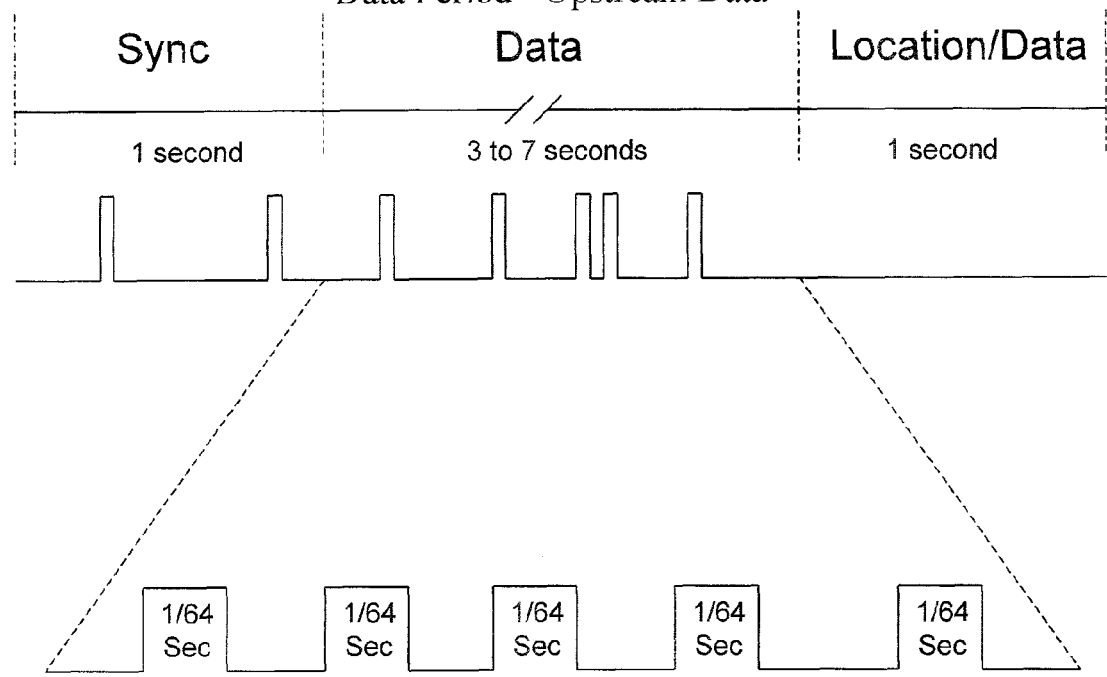
FIG. 13 is a diagram showing transition states for a data period, for upstream data, for the exemplary network described hereinabove, according to an embodiment of the invention.

FIG. 13 illustrates a data period for upstream data.

Figure 14A:
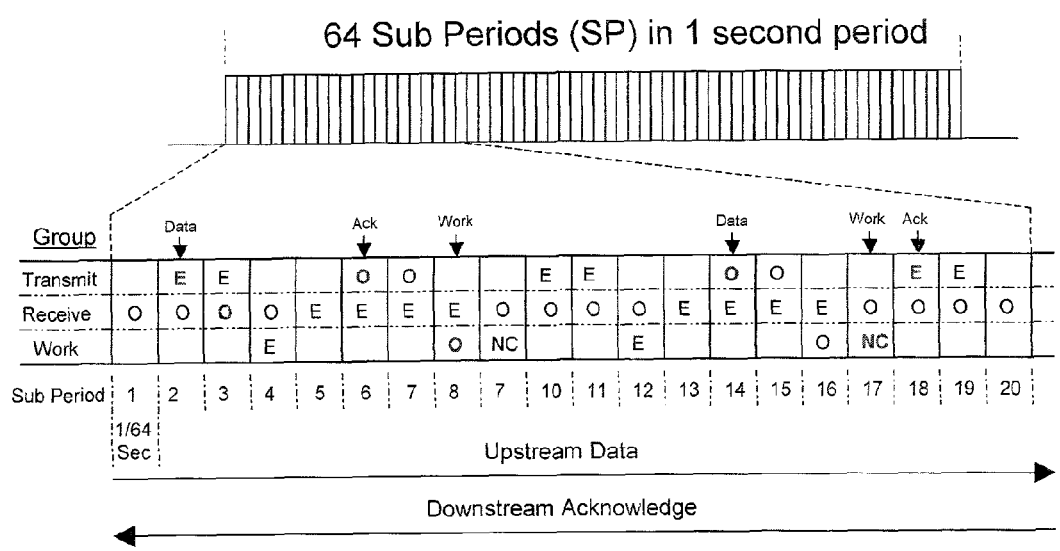
FIG. 14A is a diagram showing transition states.
Figure 14B:
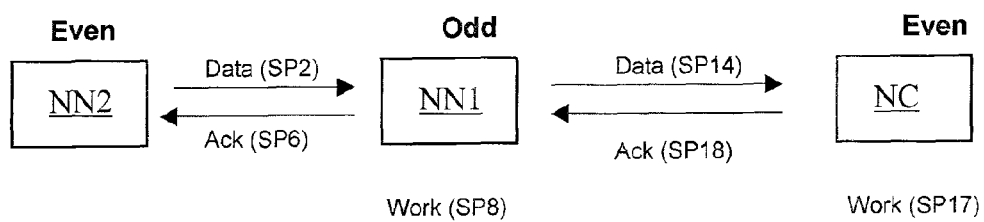
FIG. 14B is a diagram showing the flow of information, for a normal data mode period, for upstream data, for the exemplary network described hereinabove, according to an embodiment of the invention.

FIGS. 14A and 14B show Normal Data Mode Period, Upstream Data. The normal data mode scheme described above is graphically illustrated in FIGS. 14A and 14B, for upstream data.

FIG. 14A shows 64 sub-periods (SPs) in one (one second) data mode period. A data period of 1 second duration may have 64 SPs of 1/64 second each. There may be multiple (such as 3-7) periods in a row, per one sync period, in the slow sync mode.

FIG. 14B shows data flowing from NN2 through NN1 to the NC. It also shows how the data reception from NN2 is acknowledged by NN1 before the data is sent from NN1 to the NC. This is done so that NN2 can clear it's transmit buffer and be ready for more messages.

Figure 15A:
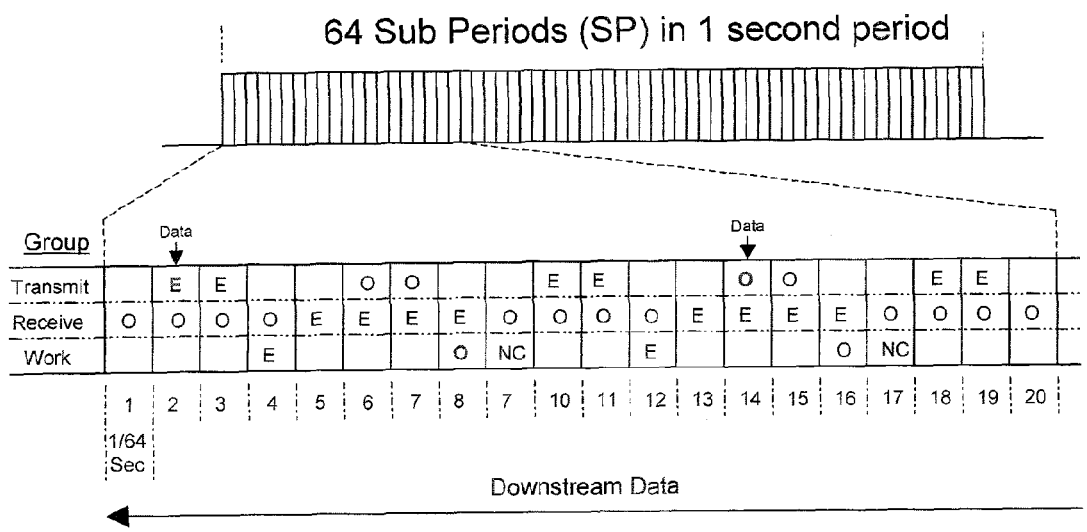
FIG. 15A is a diagram showing transition states.
Figure 15B:
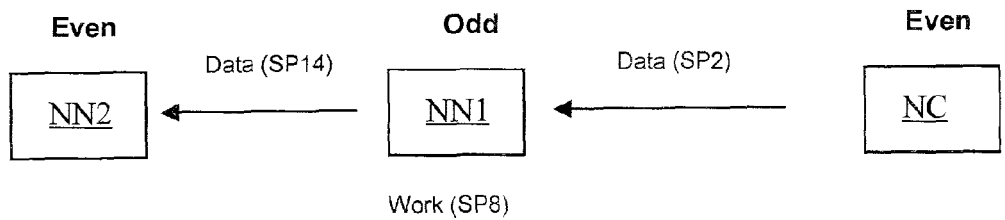
FIG. 15B is a diagram showing the flow of information, for a data mode period, for downstream data, for the exemplary network described hereinabove, according to an embodiment of the invention.

FIGS. 15A and 15B show a normal data period for downstream data. These figures show data flowing from the NC, through NN1 to NN2. The data starts flowing down in SP2, NN1 does the network routing bit masking in SP8 and sends the data down to NN2 in it's next possible transmit period SP14.

Data Communications—Downstream

Data communications with the devices may be based upon the data flags going both downstream and upstream. The data flag tells the next level of devices that there is data coming on the next data communications slot and the device should wake up and listen at the correct time.

Data slots may be based upon the last received period and level values.

Individual data items may be specified by the individual messages

Each outgoing data slot (sub-period) starts at 0 clock periods.

0, 2, 4, 6, 8, . . .

WDC and even group devices—Send data messages one after another as fast as they will go to individual groups.

WDN (odd group numbers)—RXON and listen for messages on receive group. When message is received check destination and see if message should be routed. If so transfer to downstream buffer.

1, 3, 5, 7, 9, . . .

All odd WDN group devices—Send data messages one after another as fast as they will go to downstream group numbers.

WDN (even group numbers)—RXON and listen for messages on receive group. When message is received check destination and see if message should be routed. If so transfer to downstream buffer.

Data Communications—Upstream

Data communications with the devices may be based upon the data flags.

Individual data items may be specified by the individual messages

Each upstream data slot starts at 33 clock periods. (for 64 total data slots, or SPs)

33, 35, 37, 39, . . . , 63

Even WDN devices—Transmit messages to individual parents.

Odd WDN devices—Listen for messages on individual addresses.

34, 36, 38, 40, . . . , 65

Odd WDN devices—Transmit messages to individual parents.

Even WDN devices—Listen for messages on individual addresses.

Figure 16:
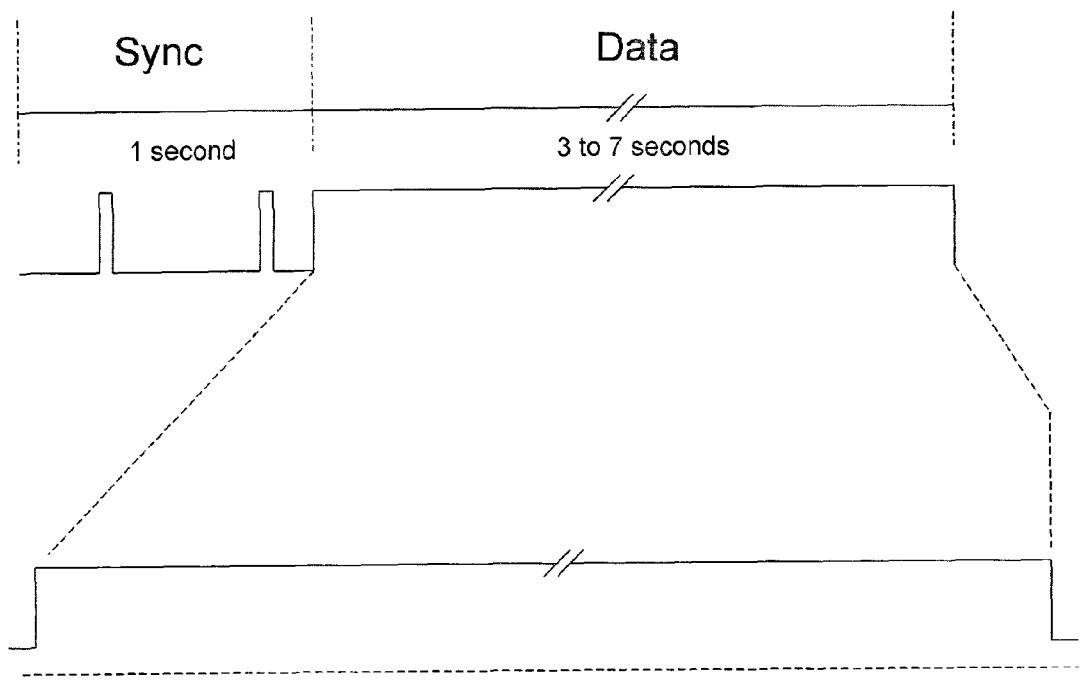
FIG. 16 is a diagram showing transition states for a network running pipeline, for the exemplary network described hereinabove, according to an embodiment of the invention.

FIG. 16 shows network running, in pipeline mode. This figure shows how the radio is running during the entire pipeline period. This is the main reason the pipeline is for large data transfers, small data transfers will waste power.

The Sensor Rail ("SAIL") (See FIG. 1, 132)

Interface Requirements

Wireless Data Nodes (WDNs, WSNs, NNs) employ a simple interface to connect potentially multiple sensors or devices and route the information through the network. (The WDC (NC) does not need the interface.) The interface may have the following attributes;

1) Simple firmware.
2) Powered from the interface itself or from the attaching device.

3) Very flexible and able to support multiple types of devices.
4) Low entry cost for components.
5) Easy for the WDN'S to route information to the devices.
6) Multiple devices can connect to the same interface.

Interface Description

The Sensor Rail (SAIL) may be defined in three different levels, or layers (see TABLE, below). Hardware/Physical defines the physical connection, Firmware/Software defines the way the devices communicate on the bus and the Application layer defines the way the device communicates with the WDN.

TABLE

SAIL Layers

Application - XML Based Messages
Firmware/Software - I2C (Inter-Integrated Circuit) Based
Physical - 4 Wire - SDA (serial data), SCL (serial clock), VCC, GROUND Hardware Layer The hardware level may comprise a 4 wire interface using standard types of connectors, for SDA, SCL, VCC and Ground. The WDN Pin layout is defined in the TABLE, below. The WDN device may comprise a 6 pin connector, for those 4 signals, plus using the last two pins for WDN specific functions. SAIL devices (such as sensors) only have to support the first 4 pins.

The SDA and SCL pins are part of the I2C (see below) bus communications and the power and ground are self-explanatory. Power will be supplied at 2.7 to 3.3 volts. Device ground and SAIL ground should be tied together in most circumstances.

TABLE

| WDN SAIL Pin Description | | | | | |
|---|---|---|---|---|---|
| 1 | 2 | 3 | 4 | 5 | 6 |
| VCC 2.7-3.3 volts | SCL (I2C CLOCK) | SDA (I2C DATA) | GROUND | WDN Specific | WDN Specific |

The connectors are standard connectors that provide a secure fit. The following connectors were used in the manufacture of the WDN. An example is 35362-0650 Molex-Digikey Firmware/Software Layer The firmware/software level may be defined by the I2C interface. This interface is standard in the small to medium microprocessor arena and is supported by multiple microprocessor manufacturers.

I2C allows for bus connections. Multiple devices can be connected to the same wires with a very specific addressing scheme which allows all devices to negotiate who has access to the bus.

It is known how to implement a slave $I^2C$ protocol. See, for example, "Microchip AN734, Using the PICmicro SSP for Slave $I^2C$ communication", incorporated by reference herein.

For the ATMEL Microcontrollers, $I^2C$ is part of the Two-wire Serial Interface. See, for example, "AVR215: Using the TWI module as $I^2C$ master", incorporated by reference herein.

Application Layer

The application layer may be defined as messages that go back and forth between the WDN and the individual devices. This layer is kept small for a reason, it cuts down on the number of messages that the SAIL devices need to respond to. All messages sent on the SAIL interface are formatted in a simple XML format. XML allows messages to change content without other devices needing to be updated to handle the messages. XML is also human readable which helps with development and debugging.

Messages sent in the application layer are sent as XML data packets. The messages that are supported by SAIL are listed below.

Any messages that are not defined by the sail interface will be automatically routed through the network to the controlling device. Any messages that are received by the WDN for it's SAIL interface that are not controlling messages will be routed onto the SAIL interface to the specified SAIL device.

Messages from the WDN to the SAIL Devices

Device Discovery

All messages sent in devices discovery may be sent on the general call address (address 0).

<sing w="????????" a="???" d="???"/>

Sent from the WDN to the SAIL bus on I2C. All devices should respond to the "sing" message with a "sack" message. The WDN will only communicate with any devices that respond with a sack message.

"w" is the id of the WDN for sack replies.
"d" is the description of the WDN device
"a" Will be from "10-100" and this is the SAIL address of the WDN.

Address Assignment

All messages sent in the address assignment phase may be sent to the WDN address specified by the 'a' argument in the "sing" message.

<soul i="????????" s="???" w="????????"/>

Sent from the WDN on address 0 to tell a device what it's SAIL address will be. After the soul message is sent the WDN will expect the device to only communicate on the bus address specified. This will allow devices to sleep until information is specifically for them.

"i" is the internal id of the device being set.
"s" may be from "10-100", and this is the SAIL address of the device.

Messages from the SAIL Devices to the WDN

Figure 17:
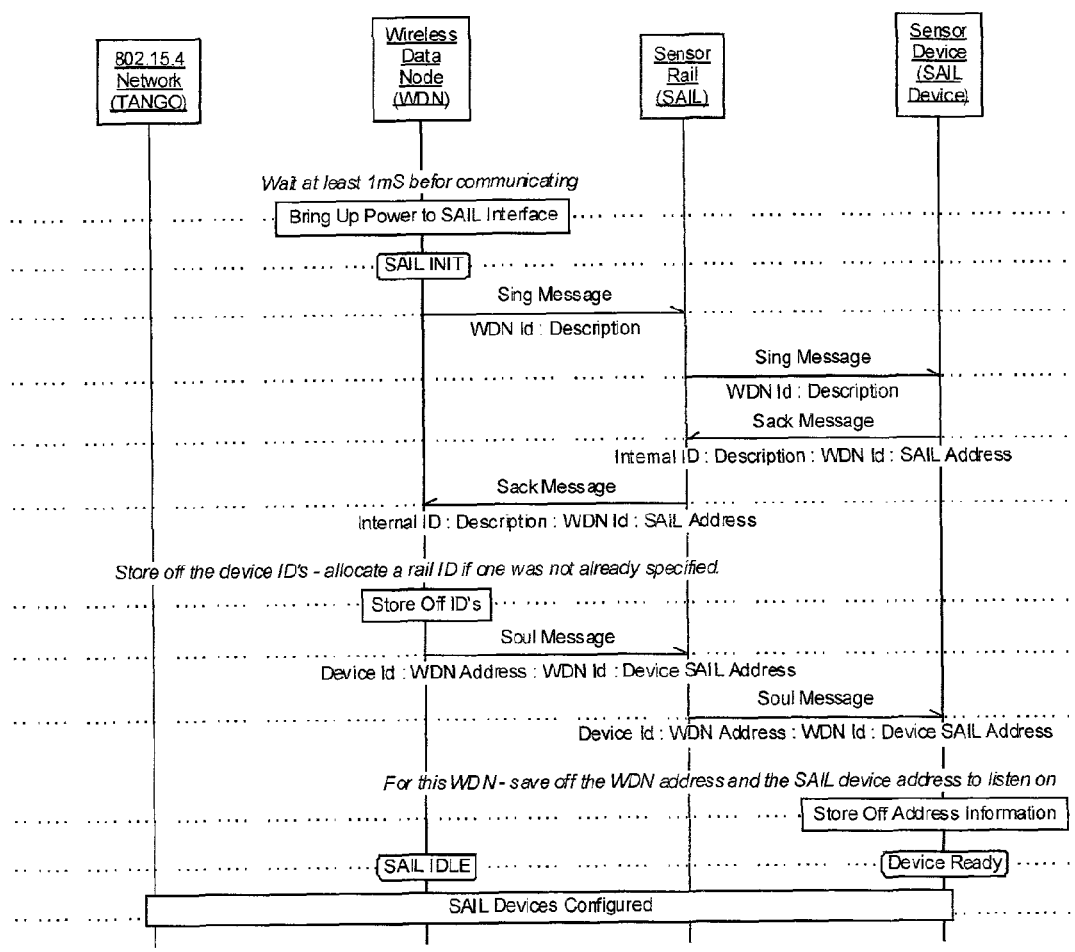
FIG. 17 is a diagram showing messages and message flow for the SAIL (internal nomenclature) device network configuration, according to an embodiment of the invention.

All messages sent in devices discovery and addressing may be sent on the general call address (address 0). A simple message flow is illustrated in FIG. 17.

<sack i="????????" d="????"/>

This message is sent from the devices in response to the "sing" message. The devices may use bus arbitration to get access to the bus. Bus arbitration is defined in the Firmware/Software layer and is the standard I2C bus arbitration.

"i" is the id of the individual device set into the firmware. This id is in hexadecimal format and should be unique for all devices on the SAIL bus. All SAIL devices must have a unique id.
"d" is a text description of the device for debugging purposes.

<stop/>

Sent when the WDN wishes to bring the SAIL interface to a quiet state. All devices that recognize this command should flush any address that is tied specifically to this WDN and go into a quiet mode until a "sing" message is sent again. This is the shutdown to keep the battery duty cycle down. 100 mS after the stop message is sent the power will go down on the SAIL bus.

<start>

Sent from the device to wake up the sail bus. The WDN will start the SAIL process with the "sing" message. When a device is initially powered up, it should send this command on the general call address (address 0)

Data Messages to and from the SAIL Devices

Data messages from the SAIL devices will be routed through the WDN network to the controlling device.

FIGS. 18A and 18B show the actual data flow. Each data message needs to have the attribute "i" in the header which will contain the SAIL device address of the requesting device. An example of a door open and it's resulting acknowledgement is shown below.

<sl i="????????" t="dopen"/>

This message shows that a door has been opened. The only things required in a SAIL message is the "i" attribute. Remainder of the message is user-specified and only needs to conform to standard simple XML and be no more than 60 bytes long. It is sent to the I2C WDN device address in the "soul" message.

i—The device address of the SAIL device that saw the door open.
    t—The device message.

<sa i="????????"/>

This message will be returned to the device that saw the door open. The WDN will keep track of addresses to make sure the message gets correctly addressed to the device. Once the SA message has been received by the SAIL device the message can be cleared from the device memory as it has been correctly stored in the WDN sending queue for subsequent routing.

i—The device address of the SAIL device that saw the door open.

Example

This is an example of message transfer from a shock sensor (id "08012241") connected to the SAIL bus that gets a shock event while the WDN (id "18442124") is asleep.

<start>

The start message is sent by the shock sensor to wake up the WDN device. This message does not need to be sent unless the WDN is asleep (no start message or WDN sent stop message).

<sing w="18442124" a="011" d="WDN"/>

Sing is the WDN telling the SAIL bus that it is up and running and is ready to allocate I2C addresses. This message is sent to the general call address (address 0).

<sack i="08012241" d="Shock Sensor"/>

This message comes from the SAIL device telling the WDN that it would like an address on the SAIL bus. Sent to the address specified in the 'sing' command.

<soul i="08012241" s="012"/>

Soul is the addressing message sent from the WDN. Once this message is sent out to the device the WDN expects the device to answer messages on the I2C address specified in the "s" attribute and send messages to the WDC on the I2C address specified in the "a" address from the 'sing' command. This message is sent on the general call address.

<sl i="08012241" t="shock"><I g="05"/I></sl>

This is an example shock message. It's sent to I2C address "011". The I tag information could also be supplied in the sl tag. It's broken out here for the example.

<sa i="08012241"/>

This is the acknowledgement of the "sl" message from the WDN sent to I2C address "012". Once the device receives this message it can clear the message from it's queue.

<stop>

Tells the SAIL bus that the WDN is going down and the power may be going out. The device has approximately 100 ms to get to a known state and shut down.

Device Requirements

If a device (such as a sensor) connects to the power part of the SAIL interface, it needs to understand that the power being supplied comes from the batteries on the WDN and may be very limited. Each device has a responsibility to limit the amount of power being used from the bus. Some microprocessors have a mode where they will wake up on address recognition. This would be the preferred method if the device does not have it's own power supply and runs from SAIL power.

Multiple Mesh Levels

It is within the scope of the invention that a mesh, such as described above, can be implemented on top of another mesh, on multiple levels to extend depth and breadth of the mesh, such as across an entire city, including many thousands of nodes. Applications may include radiation sensors, smoke detectors, traffic signals, controlling traffic signals, rerouting traffic.

By additionally meshing up the controlling devices of a mesh, each layer will control a subset of the mesh, allowing the mesh to grow exponentially.

The layering can be accomplished via frequency or time multiplexing. The different network layers can be separated in frequency or time. These can be used in separately of in conjunction to further increase the total number of meshed nodes. The current mesh network has empty periods where the mesh does no communications or work. These empty periods can be used to mesh up the controlling devices using different radios or frequencies to send information between controlling devices.

For example: Two WDC devices (wireless data controllers) are separated by 1 mile and are communicating with higher power radios. These devices are powered from the grid. Each WDC controls 300 mesh devices in a warehouse. Devices can move between each warehouse and will pick up the local mesh.

For example: The WDCs are deployed with a frequency reuse of 4 to take advantage of the minimum interference frequencies with 802.11b/g. These cells form low interference boundaries that allow handoff as the nodes move between cells. Individual nodes are time multiplexed.

For example: The number of nodes of the previous example can be further expanded by having another level of meshed WDCs controlling the first level WDCs. The top level WDC mesh would be time multiplexed and the lower WDC level mesh would be frequency multiplexed.

Low Power Considerations

Generally, low power consumption innovations were applied via hardware innovations, firmware innovations and network topology design innovations. The goal is generally to meet three criteria, resilience, low power and Radio Frequency RF Quiet in ~5 seconds. Generally, these goals are achieved with one or more of the following features:

Tango Network Protocol encodes routing into the network ID allowing for less processor duty cycle to successfully route messages.

Opening a DataPipe places all non-pipe participating nodes into a deep listen only sleep keeping their duty cycle to a minimum.

Optimize power regulator efficiency by using hardware and software/firmware to reduce power consumption by transferring the load from a linear power regulator when the power consumption is light to a switching power regulator when the power consumption is heavy. When software/firmware activates a subsystem that has heavy power consumption, it actively transfers the load to a more efficient power regulator based on the subsystem's expected power requirements.

Provide precise power consumption information to the processor by monitoring battery current consumption (rather than, or in addition to, voltage level.) Track current consumption against a real time clock to get a true reading of milliamp-hours of battery capacity used.

Software can then decide if the device needs to throttle back on activity, cut out lower priority tasks, etcetera, in order to conserve power.

Bring pertinent network parameters up the application level to allow multi level timing control of power consumption. Use this control to optimize the power consumption for each application based on its deployment, environment and use.

It should be understood that some embodiments of the invention may be implemented, for example, using a machine-readable medium or article which may store an instruction or a set of instructions that, if executed by a machine, cause the machine to perform a method or operations or both in accordance with embodiments of the invention. Such a machine-readable medium may include, for example, any suitable processing platform, computing platform, computing device, processing device, computing system, processing system, computer, processor, or the like, and may be implemented by hardware and/or software, and/or firmware and/or hybrid modules. The machine-readable medium or article may include but is not limited to, any suitable type of memory unit, memory device, memory article, memory medium, storage article, storage unit, storage medium or storage unit such as, for example, memory, removable or non-removable media, erasable or non-erasable media, writeable or re-writeable media or non-rewriteable media, digital or analog media, random access memory (RAM), flash memory, read-only-memory (ROM), programmable ROM, Erasable Programmable ROM, Electrically Erasable Programmable ROM, optical disk, hard disk, floppy disk, Compact Disk Recordable (CD-R), Compact Disk Read Only Memory (CD-ROM), Compact Disk Rewriteable (CD-RW), magnetic media, various types of Digital Versatile Disks (DVDs), a rewritable DVD, a tape, a cassette, or the like. The instructions may include any suitable type of code, for example, an executable code, a compiled code, a dynamic code, a static code, interpreted code, a source code or the like, and may be implemented using any suitable high-level, low-level, object-oriented, visual, compiled and/or interpreted programming language and/or programming environment. Such a compiled and/or interpreted programming language and/or environment may be, for example, C, C++, C#, .Net, Java, Pascal, MATLAB, BASIC, Cobol, Fortran, assembly language, machine code and the like.

It should be noted that embodiments of the invention may be used in a variety of applications. Examples of embodiments of the invention may include the usage of the invention in conjunction with many networks. Examples of such networks may include, without limitation, a wide area network (WAN); local area network (LAN); a global communication network (e.g., the Internet); a wireless communication network such as, for example, a wireless LAN (WLAN) communication network, a wireless personal area network (WPAN), a World Interoperability for Microwave Access (WiMAX) Network; a wireless virtual private network (VPN); a Bluetooth network; a cellular communication network, for example, a 3rd Generation Partnership Project (3GPP), such as, for example, a Global System for Mobile communications (GSM) network and/or a Universal Mobile Telecommunications System (UMTS).

Some demonstrative embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Enhanced GPRS (EGPRS), Code-Division Multiple Access (CDMA), Wideband CDMA (WCDMA), CDMA 2000, polarization division multiple access (PDMA) Multi-Carrier Modulation (MDM), pulse-width modulation (PWM), a Frequency Domain Duplexing (FDD) network, other techniques and any combinations thereof.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. In a wireless network comprising a network controller (NC) and a plurality of wireless network nodes (NN) arranged in a hierarchy, from a first group (GR1) which is closest to the NC to a last group (GRn) which is farthest from the NC, a method of operating the network comprising:
    configuring a sync period to have twice a number (2n) of sub-periods as groups (n) of the hierarchy wherein n is at least three;
    providing a sleep mode of operation, wherein the NC does not send out sync messages; and
    providing a Network Running mode of operation, wherein the NC sends out sync messages to achieve network synchronization by propagating a sync message through the hierarchy,
    wherein during the network running mode, a sync message is propagated downstream through the hierarchy in a group-by-group manner wherein the NNs of each group except for the last group are configured to receive, modify and retransmit the modified sync messages to a next group of NNs which are downstream in the hierarchy during each successive sub-period of the sync period.

2. The method of claim 1 wherein the modified sync messages indicate that the network node that is retransmitting is a parent node to network nodes of a next downstream group, and
    wherein after receipt of the sync message by NNs of the last group, the NNs are configured to propagate the sync message upstream through the hierarchy in a group-by-group manner from the NNs of the last group to a next group NNs that are upstream in the hierarchy.

3. The method of claim 2, further comprising: providing a Pipeline mode of operation, wherein the NC and one of the network nodes set up a pipeline, from the NN to the NC, through any intermediate NNs.

4. The method of claim 2, wherein: in the Network Running mode, providing a slow sync mode when all devices that should have reported in have reported in, otherwise entering a fast sync mode.

5. The method of claim 2, wherein a data frame comprises:
    a sync period followed by at least one data period; and
    a first portion of the sync period is divided into a plurality of sub-periods for downstream synchronization, and a second portion of the sync period is divided into a plurality of sub-periods for upstream requests.

6. The method of claim 2, wherein: in the sleep mode, a NN listens periodically for a synchronization message from the NC and, if there is no sync message, goes back to sleep.

7. The method of claim 6, wherein: as time goes by, and no sync messages are detected, the NN backs off until it is sleeping most of the time.

8. The method of claim 7, wherein: the backing off is adjusted dynamically, either by the NC or by the NN.

9. The method of claim 2, further comprising:
(a) the sync message sent by the NC specifies that it is a parent in Group 0;
(b) when the sync message is received by a NN in the first group, which is a child of the NC, the NN modifies the sync message to indicate that it is parent in the first group, and resends the modified sync message;
(c) when the modified sync message is received by a NN in a next group, which is child to a parent in the previous group, the NN in the next group modifies the sync message to indicate that it is parent in the following group, and resends the modified sync message;
(d) repeating the step (c) until the sync message is modified and sent by a next to the last group; and
(e) when the sync message is received by a NN in the last group, an upstream request portion of the sync period opens up for NNs to send requests to send data to the NC.

10. The method of claim 2, wherein:
sync messages are sent out in a sync period;
the network is set up to accommodate a number G of groups;
the sync period comprises at least 2×G sub-periods (SPs);
a first portion of the SPs are allocated for downstream synchronization; and
a second portion of the SPs are allocated for upstream requests.

11. The method of claim 10, wherein:
(a) the NC is designated as Group 0 (Gr0)
(b) in a first SP of the first portion of the SPs, the NN device in GR0 transmits, and the NN devices in Gr1 listen;
(c) in a next SP of the first portion of the SPs, the NN devices in GR1 transmit, and the NN devices in GR2 listen; and
(d) repeating the step (c) until the last group GRn is reached.

12. The method of claim 11, further comprising:
(e) in a first SP of the second portion of the SPs, the NN devices in the last group GRn transmit, and the NN devices in the next group (GRn−1) closer to GR0 listen;
(g) repeating the step (e) until the NC (GR0) is reached.

13. The method of claim 2, wherein:
data messages are send out in a data period;
the network is set up to accommodate a number G of groups; the data period comprises at least 2×G sub-periods (SPs);
the NNs are arranged in EVEN-numbered and ODD-numbered groups;
the NNs in the ODD-numbered groups listen for transmissions from the NNs in the EVEN-numbered groups in two consecutive SPs; and
the NNs in the EVEN-numbered groups listen for transmissions from the NNs in the ODD-numbered groups in two consecutive SPs.

14. The method of claim 13, wherein:
a SP before and after the two consecutive SPs is allocated for the NNs in the respective ODD-numbered or EVEN-numbered group to prepare and continue to listen to the NNs in the respective EVEN-numbered or ODD-numbered group.

15. The method of claim 2, further comprising:
providing sensors associated with at least some of the NNs; and
formatting data packets in a markup language that which allows for the ability to dynamically change or update messages.

16. The method of claim 15, further comprising:
using a protocol to discover sensors, control those sensors, configure those sensors and report addressing and sensor events back to the NC.

17. The method of claim 2, wherein: the network comprises a meshing network.

18. The method of claim 2, wherein: the network is based on IEEE 802.15.4.

19. A wireless network comprising a single network controller (NC) and a plurality of network nodes (NNs) arranged in a hierarchy from a first group (GR1) which is closest to the NC to a last group (GRn) which is farthest from the NC, the network configured to implement an addressing scheme that permits the network nodes (NNs) to route messages without a network map, and wherein network timing information is sent out on a sync message,
wherein the network controller is configured to
configure a sync period to have twice a number (2n) of sub-periods as groups (n) of the hierarchy wherein n is at least three;
provide a sleep mode of operation, wherein the NC does not send out sync messages; and
provide a network running mode of operation, wherein the NC sends out sync messages to achieve network synchronization by propagating a sync message through the hierarchy,
wherein during the network running mode, the sync message is propagated downstream through the hierarchy in a group-by-group manner wherein the NNs of each group except for the last group are configured to receive, modify and retransmit the modified sync messages to a next group of NNs which are downstream in the hierarchy during each successive sub-period of the sync period.

20. The wireless network of claim 19 wherein the modified sync messages indicate that the network node that is retransmitting is a parent node to network nodes of a next downstream group, and
wherein after receipt of the sync message by NNs of the last group, the NNs are configured to propagate the sync message upstream through the hierarchy in a group-by-group manner from the NNs of the last group to a next group NNs that are upstream in the hierarchy.

* * * * *

UNITED STATES PATENT AND TRADEMARK OFFICE
CERTIFICATE OF CORRECTION

Page 1 of 3

PATENT NO. : 8,149,748 B2
APPLICATION NO. : 11/939562
DATED : April 3, 2012
INVENTOR(S) : Anthony P. Bata et al.

It is certified that error appears in the above-identified patent and that said Letters Patent is hereby corrected as shown below:

On the Title page: Item (56), under "Other Publications", in column 2, line 3, delete "Amtel," and insert -- Atmel, --, therefor.

In the Drawings:

On Sheet 9 of 13, in Figure 14A, line 1, after "8" delete "7" and insert -- 9 --, therefor.

On Sheet 10 of 13, in Figure 15A, line 1, after "8" delete "7" and insert -- 9 --, therefor.

On Sheet 12 of 13, in Figure 17, line 3, after "SAIL" insert -- . --.

On Sheet 12 of 13, in Figure 17, line 4, delete "picke up" and insert -- picked up --, therefor.

On Sheet 12 of 13, in Figure 17, line 9, delete "befor" and insert -- before --, therefor.

On Sheet 12 of 13, in Figure 17, line 17, delete "Intemal" and insert -- Internal --, therefor.

In the Specifications:

In column 4, line 4, after "Mbps" insert -- . --.

In column 5, line 40, after "problem" insert -- . --.

In column 5, line 67, delete "imlying" and insert -- implying --, therefor.

In column 7, line 24, after "nomenclature" delete ".".

In column 9, line 8, after "source" insert -- . --.

Signed and Sealed this
Third Day of July, 2012

David J. Kappos
*Director of the United States Patent and Trademark Office*

CERTIFICATE OF CORRECTION (continued)
U.S. Pat. No. 8,149,748 B2

In column 12, line 37, after "nomenclature" delete ".".

In column 15, line 67, after "group" insert -- . --.

In column 16, line 59, delete "(FIGs.)." and insert -- (FIGS.). --, therefor.

In column 17, line 18, after "hereinabove" insert -- . --.

In column 21, line 26, after "messages)" insert -- . --.

In column 22, line 6, delete "5," and insert -- 15, --, therefor.

In column 24, line 24, delete "128 kbs," and insert -- 128 kbps, --, therefor.

In column 24, line 67, after "nomenclature" delete ".".

In column 25, line 41, after "etcetera)" insert -- . --.

In column 26, line 12, delete "Cigwin" and insert -- Cygwin --, therefor.

In column 26, line 25, after "(NC)" insert -- . --.

In column 28, line 63, after "deployment" insert -- . --.

In column 29, line 34, after "server" insert -- . --.

In column 29, line 49, after "(WDC)" insert -- . --.

In column 29, line 65, after "technology" insert -- . --.

In column 30, line 56, after "subscriptions" insert -- . --.

In column 30, line 60, after "bus" insert -- . --.

In column 30, line 64, delete "and or" and insert -- and/or --, therefor.

In column 32, line 56, after "children)" insert -- . --.

In column 32, line 61, after "0x84418420)" insert -- . --.

In column 32, line 67, after "12102201)" insert -- . --.

In column 34, line 28, after "RF)" insert -- . --.

In column 35, line 33, after "software" insert -- . --.

CERTIFICATE OF CORRECTION (continued)
U.S. Pat. No. 8,149,748 B2

In column 36, line 25, after "period" insert -- . --.

In column 41, line 64, after "groups" insert -- . --.

In column 44, line 19, after "messages" insert -- . --.

In column 44, line 41, after "messages" insert -- . --.

In column 44, line 43, after "SPs)" insert -- . --.

In column 44, line 58, delete "(See" and insert -- (see --, therefor.

In column 45, line 47, after "Digikey" insert -- . --.

In column 46, line 26, after "device" insert -- . --.

In column 47, line 2, after "0)" insert -- . --.

In the Claims:

In column 50, line 25, in Claim 1, delete "hierarchy," and insert -- hierarchy --, therefor.

In column 52, line 10, in Claim 15, after "that" delete "which".